United States Patent
Castellar et al.

(10) Patent No.: US 6,735,557 B1
(45) Date of Patent: May 11, 2004

(54) LUT-BASED SYSTEM FOR SIMULATING SENSOR-ASSISTED PERCEPTION OF TERRAIN

(75) Inventors: Javier Castellar, Santa Clara, CA (US); Luis A. Barcena, Sunnyvale, CA (US); Ignacio Sanz-Pastor, San Francisco, CA (US); William P. McGovern, Sunnyvale, CA (US)

(73) Assignee: Aechelon Technology, Sunnyvale, CA (US)

( * ) Notice: Subject to any disclaimer, the term of this patent is extended or adjusted under 35 U.S.C. 154(b) by 0 days.

(21) Appl. No.: 09/418,949

(22) Filed: Oct. 15, 1999

(51) Int. Cl.$^7$ .................................................. G06G 7/48
(52) U.S. Cl. ................................. 703/5; 703/2; 701/211
(58) Field of Search ............................... 701/211; 703/5, 703/2

(56) References Cited

U.S. PATENT DOCUMENTS

| | | | | |
|---|---|---|---|---|
| 4,645,459 A | * | 2/1987 | Graf et al. | 345/426 |
| 4,821,212 A | * | 4/1989 | Heartz | 345/419 |
| 4,890,249 A | * | 12/1989 | Yen | 345/420 |
| 5,179,638 A | * | 1/1993 | Dawson et al. | 345/427 |
| 5,995,903 A | * | 11/1999 | Smith et al. | 340/995 |

OTHER PUBLICATIONS

"IMEM: An Intelligent Memory for Bump and Reflection Mapping" A. Kugler, ACM 1998, 1–58113–097–/98/8.*
"The Design and Analysis of a Cache Architecture for Texture Mapping Z. Hakura, 1997 ACM 0–89791–901–7/97/0006".*
"Sensor Texture Maps (STM's) for Multi–Spectral Scene Simulation", Photon Research Associates (PRA), Apr. 1999.*
MIL STD 2408(DMA) Glossary of Feature and Attribute Definitions, Apr. 21, 1995.*
"Intractive Display of Very Large Textures" D. Cline, IEEE 0–8186–9176 1998.*
"The Design and Analysis of a Cache Architecture for Texture Mapping" Z. Hakura, ACM 0–89791–901–7/97.*
"Fast Terrain Rendering Using Geometrical MipMapping" W. de Boer, e–mersion Project 10/00.*
Anding, David C. et al., "Real–Time Image Visualization for Sensors", R–015–96(3–15), pp. 1–9.
Gersuk, Stephen H., Paradigm Simulation, Inc. "Quantitive IR Rendering in the SGI Graphics Pipeline", pp. 1–6.

* cited by examiner

Primary Examiner—Kevin J. Teska
Assistant Examiner—Fred Ferris
(74) Attorney, Agent, or Firm—Fenwick & West LLP

(57) ABSTRACT

A set of specially-configured LUT's are used in a rasterizing portion of a graphics system for simulating Sensor-assisted Perception of Terrain (SaPOT) so that simulation of the image produced by a given sensor can proceed rapidly and with good accuracy at a per-texel level of resolution. More specifically, terrain texels-defining memory is provided with a plurality of addressable texel records where each record contains: (a) one or more material identification fields (MID's); (b) one or more mixture fields (MIX's) for defining mixture proportions for the materials; and (c) slope-defining data for defining a surface slope or normal of the corresponding texel. A sky-map LUT is provided for simulating the act of looking up to the sky along the normal surface vector of a given texel to thereby obtain a reading of the sky's contribution of illumination to that terrain texel. A reflectance LUT is provided for simulating the act of reflecting filtered radiation (light) off the material surface of the given terrain texel to thereby obtain a reading of the amount of light that the surface of the texel will reflect. The reflectance and sky contribution factors are multiplied to obtain a per-texel signal representing the amount sensor-detectable light produced from each terrain texel. A generally similar approach is taken to determine what amount of sensor-detectable, black body radiation will be produced from each terrain texel. Each terrain texel is simulated as having a specifiable mixture of plural surface materials. Each terrain texel is allowed to be shadowed during different times and the per-texel shadowing is accounted for.

16 Claims, 15 Drawing Sheets

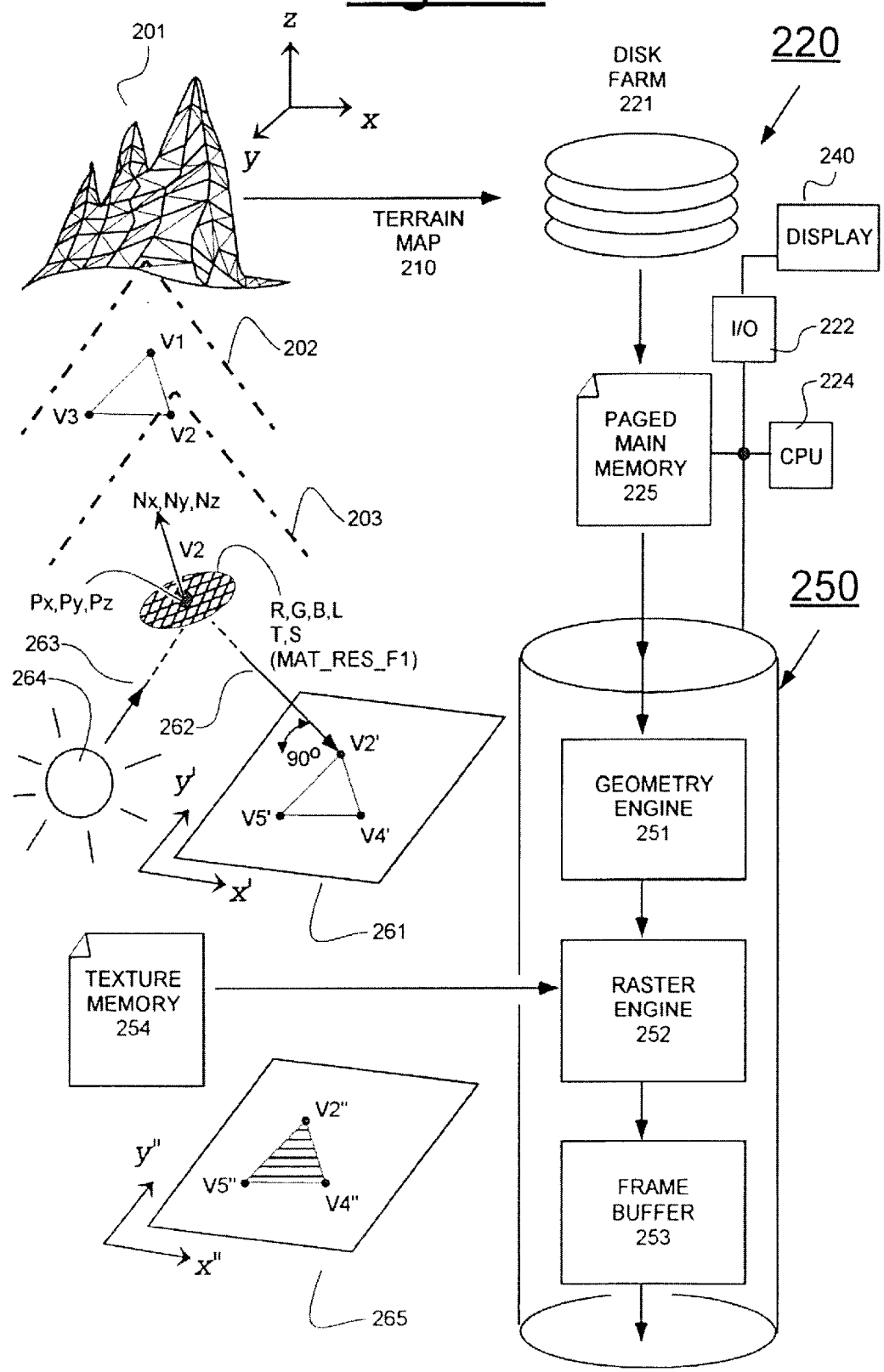

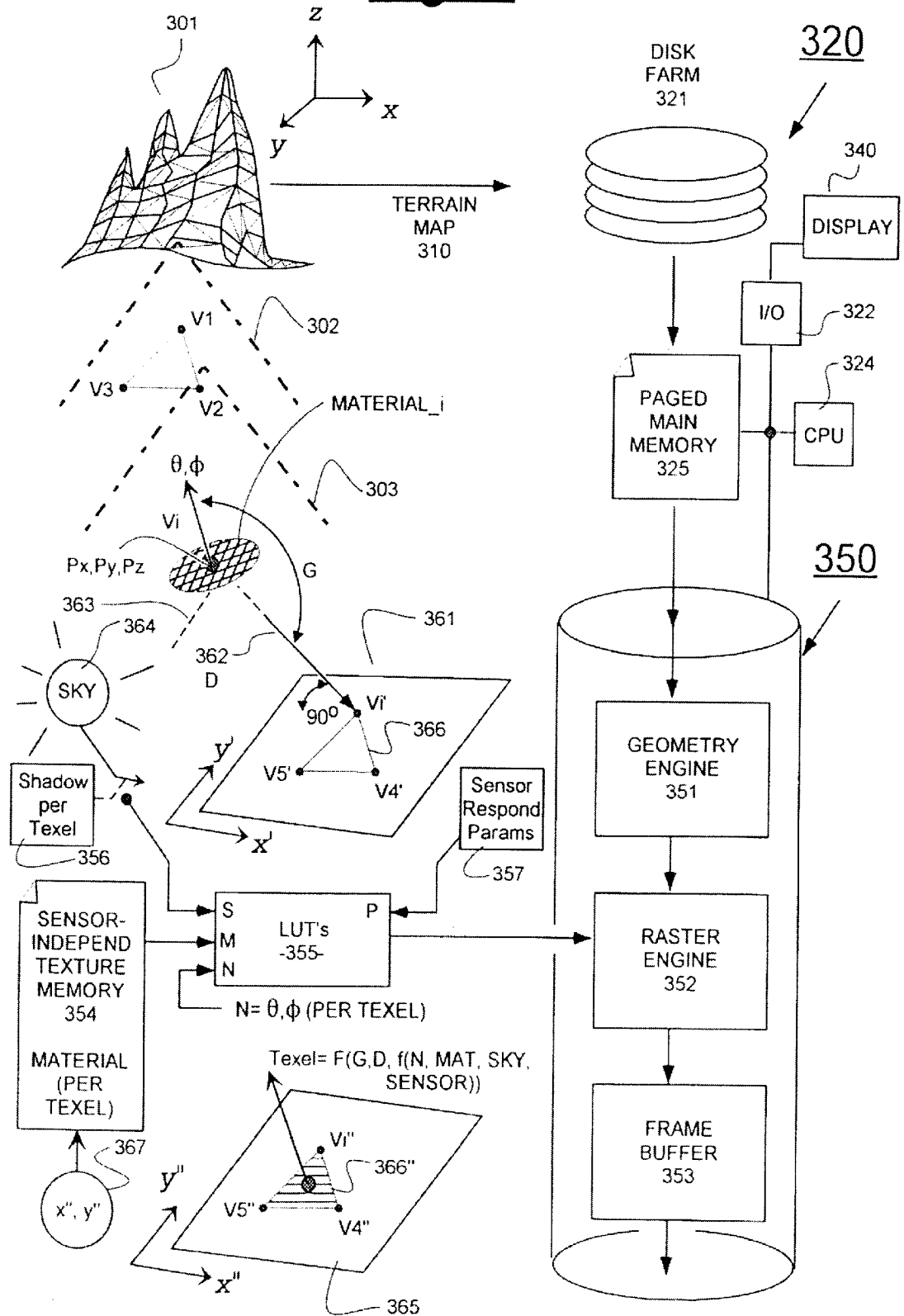

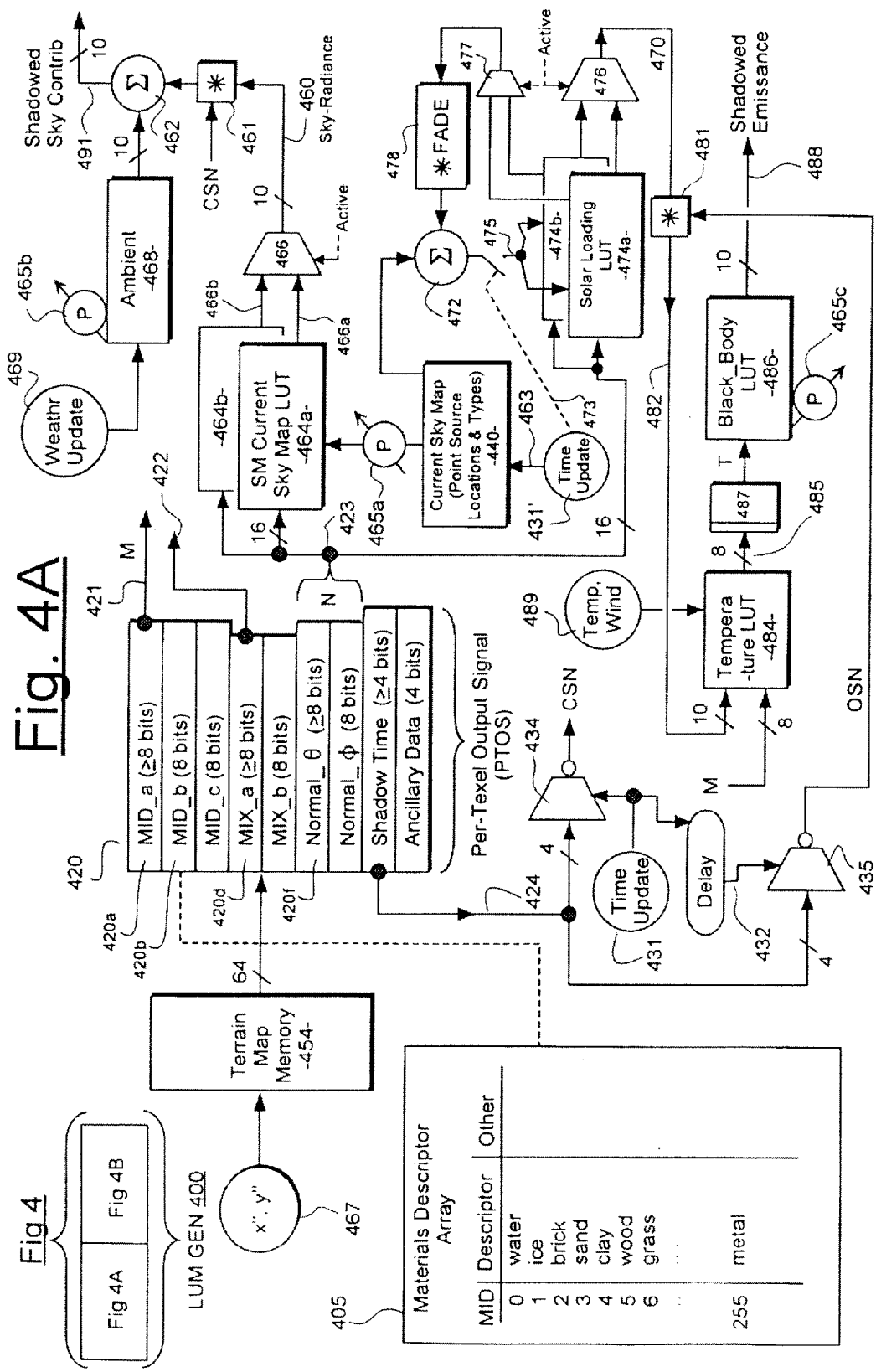

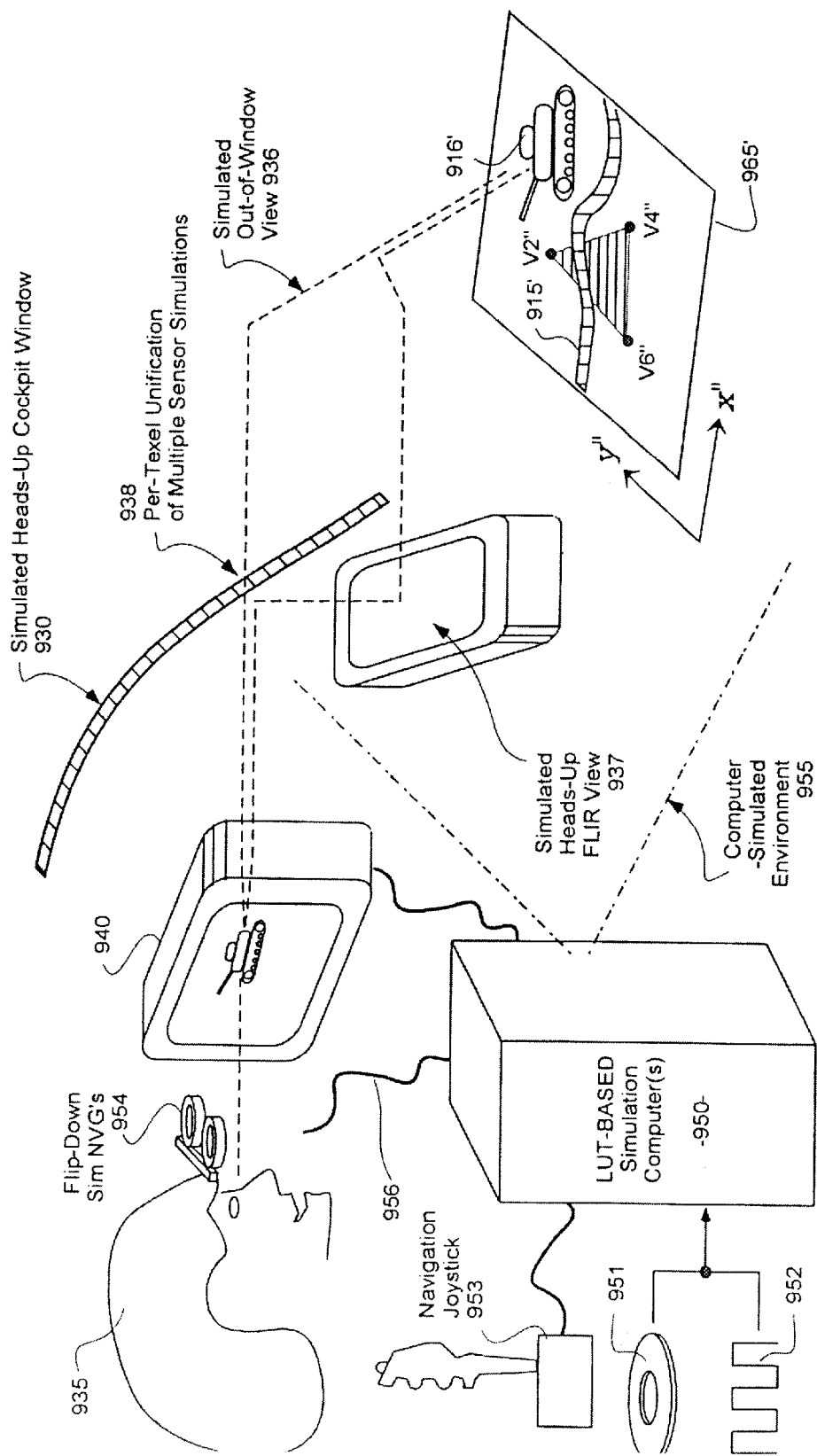

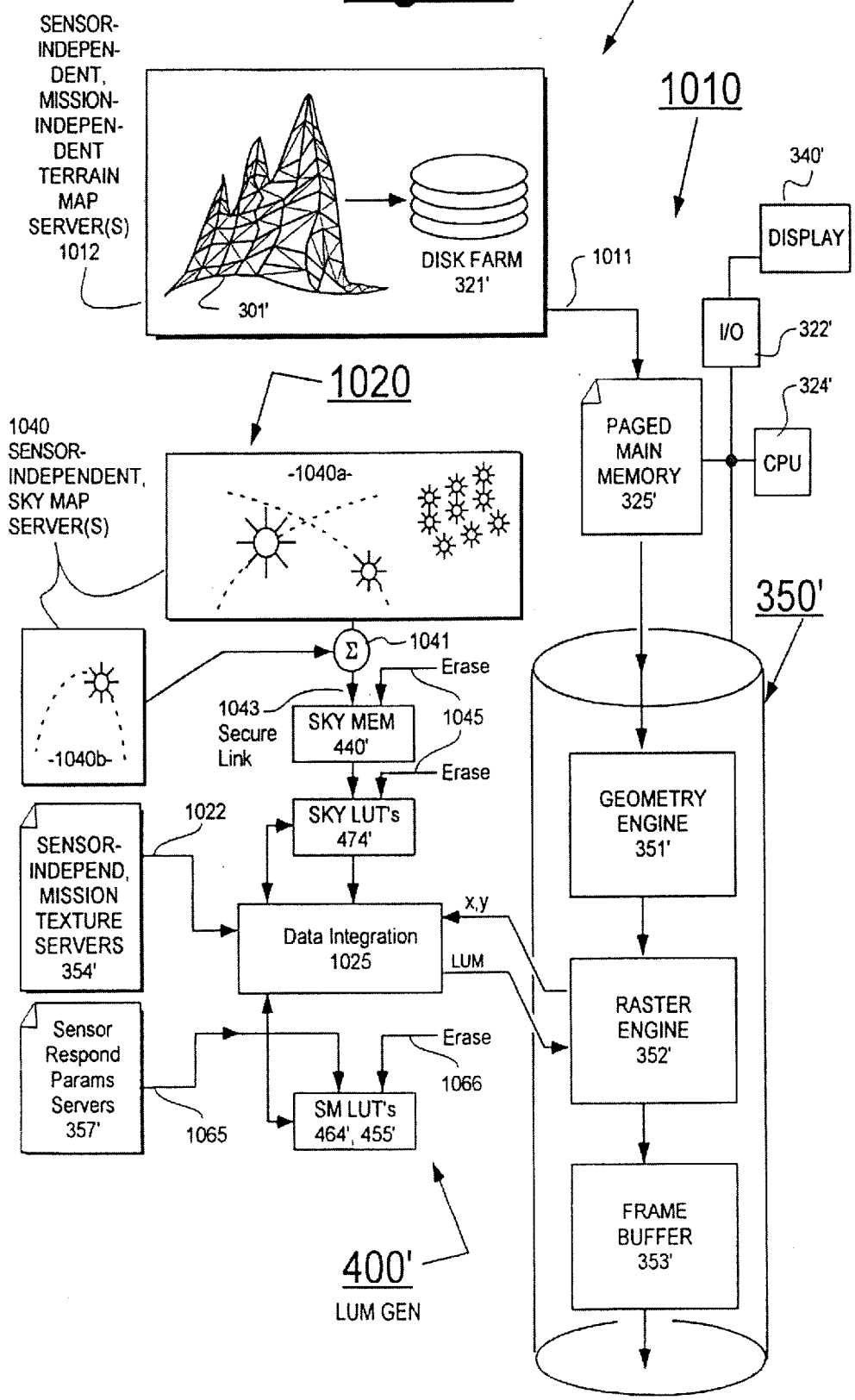

LUT-BASED SYSTEM FOR SIMULATING SENSOR-ASSISTED PERCEPTION OF TERRAIN

BACKGROUND

1. Field of Invention

The present disclosure relates generally to Sensor-assisted Perception of Terrain (SaPOT).

It relates more specifically to computer systems that simulate Sensor-assisted Perception of Terrain. It relates yet more specifically to simulation of real-time SaPOT, where the latter Sensor-assisted Perception of Terrain may be provided, by way of example, for a pilot in an aircraft flying over a terrain of a given topology and a given makeup of materials, where the terrain is illuminated by various sources of radiation (e.g., moonlight, star light) and is thermally-preloaded (e.g., by the daytime sun).

2. Reference to Included Computer Program Listings

This application includes one or more listings of computer programs. The owner of the present application claims certain copyrights in said computer program listings. The owner has no objection, however, to the reproduction by others of such listings if such reproduction is for the sole purpose of studying them to understand the invention. The owner reserves all other copyrights in the program listings including the right to reproduce the computer program in machine-executable form.

3. Description of Related Art

Pilots of aircraft or other pilot-controlled vehicles sometimes guide their craft over a given terrain with the assistance of vision-augmenting equipment.

Examples of vision-augmenting equipment include Night Vision Goggles (NVG's) and Low Level Light Television Cameras (LLLTV's).

Such vision-augmenting equipment typically convert hard-to-see imagery in one or more, of the visible and/or invisible spectral bands into imagery that is more clearly visible to the human eye. One example of an invisible spectral band is the Near Infrared Range (NIR) which begins at a wavelength ($\lambda$) of around 0.65 $\mu$m and/or slightly longer wavelengths and continues to longer wavelengths. Another example of an invisible spectral band is the Far Infrared Range (FIR) which begins at around 1.00 $\mu$m and/or slightly longer wavelengths and continues to longer wavelengths.

LLLTV's usually amplify photon energy in one or more, of the visible spectral bands (whose $\mu$ is between around 0.4 $\mu$m {violet end} and 0.65 $\mu$m {red end}) and sometimes, also downshift and amplify energy in the low NIR band so as to make imagery within those bands more visible to the human eye. The exact bands or sub-bands of operation may vary depending on specific missions. Such missions can be of a law-enforcement nature, or of a military nature, or of another nature. By way of example, a given kind of law-enforcement or agricultural mission might include the seeking out certain types of vegetation whose chlorophyl reflects or absorbs with a specific spectral signature. In such a case, LLLTV sensor response might be controlled to peak in correlation with spectral signature peaks of the targeted vegetation. Searchers will then be able to spot the targeted vegetation more easily.

NVG's usually operate in the NIR band and produce visible imagery by downshifting wavelength and amplifying. The exact bands or sub-bands of operation may vary depending on specific missions. For example if the mission includes seeking out certain types of objects that are highly reflective of moonlight, the NVG response might be controlled to peak in correlation with spectral signature peaks of the targeted objects.

Forward Looking InfraRed (FLIR) sensors are another example of vision-augmenting equipment. FLIR's usually operate in a broadband mode that extends across the FIR and NIR bands for producing visible imagery by downshifting wavelength and amplifying. The exact bands or sub-bands of operation and filtering functions may vary depending on specific missions. For example if the mission includes seeking out certain types of very-hot objects that emit black body radiation, the FLIR response might be controlled to peak in correlation with black body emission peaks of the targeted, high temperature objects.

Generally speaking, vision-augmenting equipment use one or more, specially-designed sensors to detect radiations that are either invisible to the human eye or difficult for the human eye to see as distinct imagery. Electronic means or optoelectronic means or other means are provided for converting and/or amplifying the imagery of the sensor-detected radiations into imagery which is clearly visible to the human eye. The sensor-detected radiations may be in the form of reflected energies (e.g., moonlight reflected from IR-reflecting materials) or in the form of directly radiated energies (e.g., IR radiated from a hot automobile engine or from flares), or combinations of both.

Specific uses of vision-augmenting equipment (e.g., specific missions) may occur in combination with specific lighting environments (e.g., moonlight, cloud reflection, etc.) and specific mixes of terrain materials (e.g., IR-reflecting features, UV-absorbing features, etc.). Each unique kind of mission may call for a correspondingly unique mix of sensors, where each sensor may have a respective, application-specific set of frequency responses and/or sensitivities.

Because vision-augmenting equipment often display imagery which is different from that which a pilot may be accustomed to seeing naturally with his or her own eyes, it is often desirable to train pilots ahead of time so that the pilots can correctly interpret what they see with the vision-augmenting equipment when actual flights occur.

One method of training pilots is to let them practice flying over a given terrain, first while looking out-of-window from the cockpit in daylight conditions, and second by repeating the daytime run under night conditions while using the vision-augmenting equipment to view the same terrain.

A more cost-effective method subjects pilots to computer simulations of both Out-of-Window Perception Of Terrain (OwPOT) and Sensor-assisted Perception Of Terrain (SaPOT) under different conditions of lighting, given different terrain topologies, different terrain materials, different sensor types, and so forth.

A conventional OwPOT/SaPOT simulating system will typically have a very large farm of disk drives (or bank of tape drives) that store approximately 1-TeraByte ($10^{12}$ bytes) of digitized terrain information or more.

This 'terrain map' information is usually formatted as a collection of three-dimensional polygons (generally triangles) within an x, y, and z Cartesian frame of reference that represents a real world region having dimensions of approximately 1000 kilometers (1000 Km) by 1000 Km (1 Mm) or more. The distance between adjacent vertices of each polygon will typically correspond to a real world distance of about 100 meters (100 m), which inter-vertex distance is, about $10^{-4}$ times the side dimension of the overall terrain map.

The exemplary 1 Mm×1 Mm area given above for the terrain map may represent a maximal, mission range for a given type of aircraft. The real world area that is represented by a given terrain map can be greater or smaller as may vary with mission specifics. Similarly, the exemplary, 100 m inter-vertex distance given above for each polygon may represent an empirically selected resolution setting. The inter-vertex distance can be greater or smaller as may vary with different and practical map-creating techniques, different mission objectives, and differing capabilities of OwPOT/SaPOT simulating systems to handle maps of higher or lesser resolution.

In a conventional OwPOT/SaPOT simulating system, the following, 'per-vertex' items of digitized information will usually be stored in the terrain map for each vertex of each polygon:(a) the x, y, z spatial coordinates of the vertex point; (b) a three-dimensional normal vector for defining the slope of a material surface at only the vertex point; (c) color values for defining a perceived, reflected or radiant color of the surface material at the vertex point; and (d) texture values for use in adding texture to the interior of the polygon during rasterization.

The disk farm which holds the conventional terrain map is typically connected to an image-rendering computer system. The image-rendering computer system usually includes a paged, main memory, and one or more graphics-rendering pipeline processors coupled to the main memory. Each graphics-rendering pipeline processor generally includes (1) a geometry engine, (2) a rasterizing engine, and (3) a frame buffer.

The geometry engine receives as one of its inputs, 3D polygon information that is paged in from the 3D, vertices-only, terrain map. The geometry engine also receives as inputs, the position, angle and size of a hypothetical viewing window. The geometry engine also receives as inputs, the positions and intensities of one or more light sources that are illuminating the 3D terrain. In response, the geometry engine computationally projects a set of 2D polygons onto the hypothetical viewing window.

These, projected 2D polygons represent a first order, wire-frame estimation of the image that will be viewed through the hypothetical viewing window based on the given lighting conditions and the 3D terrain represented by the inputted terrain map. The viewing window is typically a planar rectangle that is positioned at some angle and position within the 3D reference frame of the terrain map.

Ray tracing is typically employed to create the 2D polygons projection. A backward ray tracing algorithm may trace back along each of, plural and corresponding normal vectors of the viewing window to exposed polygon vertices in the 3D terrain. The backward ray tracing algorithm will typically continue to trace backwardly, along appropriate refection angles, from the exposed 3D polygon vertices, back to one or more, exposed light sources. Then, based on factors such as the traced distance from the viewing plane back to the light source, the reflection angle, and the color attributes of the 3D polygon vertex; the geometry engine will determine how much and what color of light is to be attributed to each 2D vertex point of each polygon on the planar viewing window.

Geometry engines are typically rated for performance speed in terms of how many polygons per second they can process. In other words, a speed value is given indicating how many triangles or other polygons the geometry engine can step through and project onto the viewing window in a given unit of time. Because geometry engines generally perform many complex calculations, their polygons/second processing rate tends to be relatively low.

As explained above, the output(s) of the geometry engine (s) usually represent a first order or wire-frame estimation of the image that will be viewed through the hypothetical viewing window. To improve on this estimation, the 2D output of each geometry engine is transmitted to a rasterizing engine of the same graphics-rendering, pipeline processor. The rasterizing engine adds higher-resolution, texture information into the interior of each two-dimensional polygon that has been projected onto the viewing window by the geometry engine. The texturizing process often includes the steps of: (a) referencing a texture map, (b) pulling appropriate texture data from the texture map in response to information of the surrounding polygon-vertex points and the position within the polygon that is being texturized, and (d) writing that pulled texture data into a corresponding 'texel' (a texture pixel) within the two-dimensional polygon that is being texturized.

Rasterizing engines typically have their performance speeds rated in terms of how many frame-buffer pixels or texels (texture pixels) per second they can process. Generally, the texels/second rate of a rasterizing engine is orders of magnitude larger (e.g., 100 times greater or more) than the polygons/second rate of the corresponding geometry engine. For example, a given geometry engine may process $10^7$ triangles per second while a rasterizing engine of a like technology will process $10^9$ texels per second (2 orders of magnitude greater).

The 2D, texturized imagery that is created by the rasterizing engine is generally stored in a high-speed frame buffer (e.g., video RAM) and eventually passed through to a display system for viewing by a human observer.

The above-description of a typical, image-rendering computer system covers only the generic situation in which it is assumed that only the visible frequency band of light is to be considered and only the response of the human eye to such light is to be considered. This assumption of course, fails to hold true for the Sensor-assisted Perception of Terrain part of a OwPOT/SaPOT simulating system because the SaPOT part of the operation needs to consider multiple frequency bands and the reflection characteristics of different terrain materials in each of these, bands and the cumulative response characteristics of different sensors to all the relevant frequency bands.

A number of tricks are often used in the conventional OwPOT/SaPOT simulating system to make the generic, graphics-rendering, pipeline processor behave as though it were simulating a sensor that is responsive to multiple frequency bands and as though it were simulating various terrain materials that reflect differently in each of these bands. For each frequency band (e.g., NIR, FIR, etc.) or sub-band under consideration, the per-vertex colors of the terrain map are re-encoded so that they mimic the response of a given sensor at the given frequency band and so that they also mimic the reflecting characteristics of the corresponding terrain material which is present at the corresponding vertex point of the respective terrain polygon. Then, for each frequency band, the correspondingly re-encoded terrain map is run through the graphics-rendering, pipeline processor so as to create a band-specific image in the frame buffer for the specific sensor. Multiple passes are generally required, with each such pass handling only one of the bands or sub-bands and also the specific arrangement of light sources that operate in that band or sub-band. A first of the saved, and (sub-)band-specific, frame buffers may define sensor response to the terrain as illuminated by a single point source such as the sun being positioned in a specific part of the sky at a given time of day. A second such frame buffer may indicate a superposable, sensor response due to illumination by a different light source such as the moon (infrared radiation source) being located elsewhere. Yet a third frame buffer may provide a corresponding and superposable image for the sensor when the terrain is illuminated by a diffuse light source such as a clouded sky. A further fourth frame buffer may provide a corresponding superposable image for the sensor when the terrain is illuminated by an artificial light source such as a spectrally-specific flare that is momentarily injected into a specific location in the scene.

The resulting, (sub-)band-specific and sensor-specific, frame buffers are then combined according to the frequency-domain, integrating properties of the specific sensor so as to produce a composite frame. This composite frame is then displayed in a corresponding time slot for viewing by the pilot-in-training.

To produce moving pictures, composite frames need to be composed for respective time slots and then displayed in sequence, one after the next. The pilot-in-training is usually allowed to manipulate a joystick that guides his simulated aircraft through the simulated terrain according to arbitrarily selected, flight maneuvers. Terrain map information is paged into the system's main memory on an as-needed basis and processed accordingly to try to produce a real-time simulation of what the pilot-in-training would see through the vision-augmenting equipment (e.g., Night Vision Goggles) under the simulated conditions.

The real-time production of composite image frames, where each composite image frame is generated by weighted integration of multiple frame buffers, typically calls for very expensive, and high speed hardware (e.g., workstations from Silicon Graphics Inc., where SGI is a well known, computer graphics company located in California). Even when such expensive, and high speed computer hardware is used, the one-(sub-)band at a time, multi-pass operations of the conventional Ow/SaPOT simulating system are so time-consuming that they strain the ability of the system to provide realistic simulations of sensor response. Rendering resolution is particularly limited by the vertex-per-second speed of the geometry engine or engines, which, as explained above, tend to be relatively slow.

Because of the above difficulties, previous sensor-simulating computer systems provided composite images of generally poor resolution and slow speed.

Worse yet, if sensor attributes had to be changed because one wished to simulate the response of a new and different sensor, completely new re-encodings of the entire terrain map generally had to be provided. This meant that extremely large disk farms (or tape drive banks) had to be provided if one wished to be able to quickly switch from simulating a first sensor to simulating a different, second sensor. The problem of requiring large disk farms, with new terrain map encodings for each kind of sensor, compounded to even larger proportions if one wished to store maps of different terrains, one for each of a large number of different sensors.

In view of the above, there has been a long felt but unsolved need in the art of simulating real-time Sensor-assisted Perception of Terrain (SaPOT) to have computer systems and methods that provide better resolution, at higher speed and at less cost. Moreover, for some mission applications (e.g., law enforcement or military), the maintaining of mission secrecy is a concern. Prior methods of maintaining re-encodings of large terrain maps presented serious security problems.

SUMMARY OF INVENTION

Structures and methods may be provided in accordance with the invention for overcoming the above-mentioned problems. More specifically, means may be provided in accordance with the invention for defining luminance signals for use by a rasterizing engine of a graphics pipeline, where the defined luminance signals account for contributions that may be made to the viewed image due to one or more of the following: (a) sensor response characteristics, (b) terrain materials characteristics, and (c) cumulative lighting sources.

In general, one embodiment of the invention may be seen to comprise a set of specially-configured LUT's that are used in a rasterizing portion of a graphics system for simulating Sensor-assisted Perception of Terrain (SaPOT). Data flow through the LUT's is arranged so that simulation of the image produced by a given sensor can proceed rapidly and with good accuracy at a per-texel resolution. More specifically, the set of lookup tables includes a sky-map LUT which is provided for simulating the act of looking up to the sky along the normal surface vector of a given texel to thereby obtain a reading of the sky's contribution of illumination to that texel. A reflectance-LUT is further provided for simulating the act of reflecting filtered radiation (light) off the material surface of the given texel to thereby obtain a reading of the amount of light that the surface of the texel will reflect. The reflectance and sky contribution factors are multiplied to obtain a per-texel signal representing the amount sensor-detectable light produced from each texel. A generally similar approach is taken to determine what amount of sensor-detectable, black body radiation will be produced from each texel. Reflected radiance and emitted radiance may be added together on a per-texel basis to provide an accurate composite of contributions from both. Each texel is allowed to have a specifiable mixtures of plural surface materials. The mixture factors are also accounted for. Each texel is allowed to be shadowed during different times and the per-texel shadowing is accounted for. As such, a fast but high-resolution system is provided for simulation of SaPOT.

A terrain texels-defining memory may be provided in accordance with the invention to comprise a plurality of addressable texel records where each such record contains: (a) one or more material identification fields (MID's) for identifying one or more materials making up the surface of a corresponding terrain texel; (b) one or more mixture fields (MIX's) for defining mixture proportions for the materials identified as making up the surface of the corresponding texel; and (c) slope-defining data for defining a surface slope or normal of the corresponding texel, where the slope-defining data is preferably, normal vector data that immediately defines a vector that is normal to the surface of the corresponding texel.

A terrain texturizing apparatus in accordance with the invention comprises: (a) a sensor-modulated, current sky-map LUT (lookup table) for receiving per-texel normal vector data and for responsively producing sky radiance data representing a per-texel contribution of illumination from a given sky map, as seen through spectral filtering characteristics of an in-use sensor; (b) a sensor-modulated, reflectance LUT for receiving per-texel surface material identifying data (MID's) and for responsively producing sensor-modulated reflectance signals ($R_{SM}$) representing a per-texel reflecting factor due to the surface material make up of the corresponding texel and further due to spectral filtering characteristics of the in-use sensor; (c) a temperature LUT for receiving solar loading data and per-texel surface material identifying data (MID's) and for responsively producing per-texel temperature signals representing a per-texel temperature due to the surface material make up of the corresponding texel and its thermal history; (d) a black body LUT for receiving the per-texel temperature signals and for responsively producing per-texel emissance signals; (e) a radiance combining element for receiving the per-texel emissance signals of the black body LUT, the sky radiance data of the current sky-map LUT, the sensor-modulated reflectance signals of the reflectance LUT and for responsively producing per-texel and per-material luminance signals.

A machine-implemented, terrain texturizing method in accordance with the invention comprises the steps of, for each to-be-illuminated pixel (texel): (a) identifying one or more materials making up the surface of the texel; (b) defining mixture.proportions for materials making up the surface of the texel; (c) defining a vector that is normal to the surface of the texel; (d) using the normal vector to look up into a supplied sky map and to thereby determine an amount of radiance contributed to the texel from the sky map; (e) using spectral filtering characteristics of an in-use sensor to modulate the per-texel amount of radiance contributed to the texel from the sky map; (f) using spectral filtering characteristics of materials making up the surface of the texel to determine black body emissance amounts of the texel; (g) combining the per-texel black body emissance amounts and the per-texel radiance amounts to thereby define a per-texel luminance values attributable to the texel; and (h) using the per-texel luminance values to paint a corresponding pixel in a frame buffer.

A secured terrain simulation method in accordance with the invention comprises the steps of: (a) supplying as separate data signals, (a.1) general terrain vector information; (a.2) sensor-independent sky map .information; (a.3) sensor-independent, terrain overlay texture information; and (a.4) sensor parameters.

A perception of terrain unifying method in accordance with the invention comprises the steps of: (a) providing an Out-of-Window Perception Of Terrain (OwPOT) image on a per-texel basis; (b) providing a Sensor-assisted Perception of Terrain (SaPOT) image on a per-texel basis; and (c) blending the OwPOT and SaPOT images.

A method in accordance with the invention for producing a reflectance LUT for use in conjunction with a specified sensor comprises the steps of: (a) assigning successive and unique material identifications (MID's) to a set of different materials that can be found in a prespecified, target terrain, the MID's being translatable into successive and unique addresses of to-be-defined contents of the reflectance LUT; (b) obtaining data defining reflection percentage (Rho) versus wavelength for each of said set of different materials, where the Rho data covers a relevant wavelength range, $\lambda_0$ to $\lambda_1$ of the specified sensor; (c) integrating the Rho versus wavelength function for each of said set of different materials to thereby define respective, cross-band reflection values (R) for each of the materials; and (d) recording the obtained cross-band reflection values as said addressable contents of the reflectance LUT. This producing method can be refined to provide the recording of sensor-modulated reflection values ($R_{SM}$) in the reflectance LUT by obtaining data defining relative detection sensitivity versus wavelength for the specified sensor and multiplying such detection sensitivity data with the Rho data on a per wavelength basis during said integration operation.

A method in accordance with the invention for producing a sky-map LUT for use in conjunction with a specified sensor comprises the steps of: (a) defining a coordinate system for pointing to different positions of an illuminating sky that can be found in a prespecified, mission arena, the sky coordinates being translatable into successive and unique addresses of to-be-defined contents of the sky-map LUT; (b) obtaining data defining illumination power density versus wavelength for each of a set of different illuminating sources that can be present in said mission arena, where the illumination power density data covers a relevant wavelength range, $\lambda_0$ to $\lambda_1$ of the specified sensor; (c) integrating the illumination power density versus wavelength function for each of said set of different sources to thereby define respective, cross-band contribution values (PSD) for a center of each of the sources; and (d) recording the obtained cross-band contribution values (PSD) as said addressable contents of the sky-map LUT. This LUT producing method can be refined to provide the recording of sensor-modulated contribution values (SM-PSD) in the sky-map LUT by obtaining data defining relative detection sensitivity versus wavelength for the specified sensor and multiplying such detection sensitivity data with the illumination power density data on a per wavelength basis during said integration operation.

Other aspects of the invention will become apparent from the below detailed description.

BRIEF DESCRIPTION OF THE DRAWINGS

The below detailed description makes reference to the accompanying drawings, in which:

FIG. 2A is a schematic diagram illustrating a conventional, image rendering computer system without multi-band capability;

FIG. 3 is a block diagram of a Ow/SaPOT simulating system in accordance with the invention;

FIG. 9 is a schematic diagram illustrating a computer system that can perform a per-texel unification operation for plural images; and FIG. 10 is a schematic diagram illustrating methods for securing sensitive portions of mission specific information.

DETAILED DESCRIPTION

Figure 1:
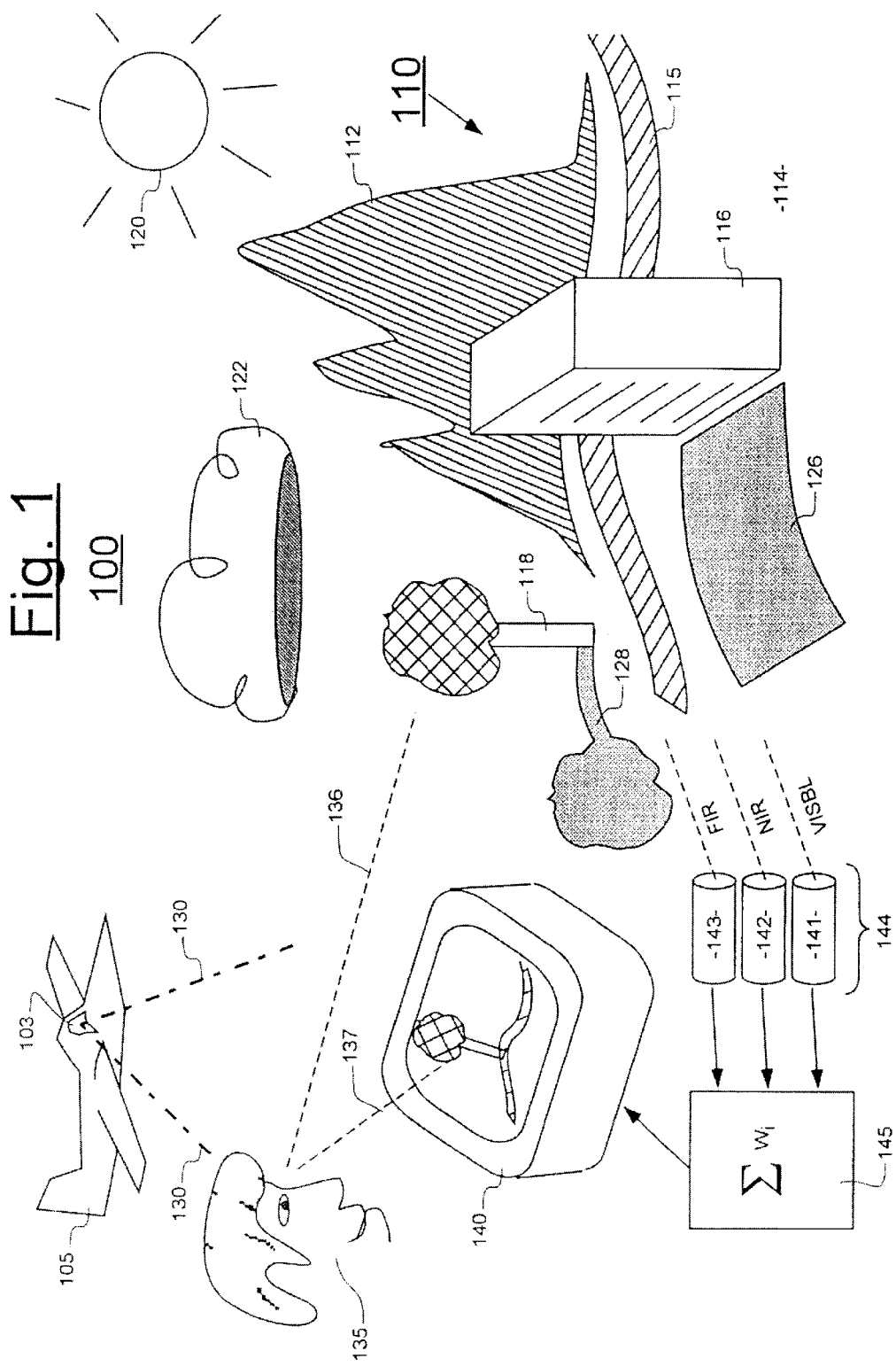
FIG. 1 is a schematic perspective of an environment which a Ow/SaPOT simulating system may be expected to simulate.

FIG. 1 provides a perspective and schematic view of an environment 100 in which an aircraft 105 is flying over a given, three-dimensional terrain 110. The 3D terrain 110 may include various 3D features that are composed of different surface materials and have different topological profiles. By way of example, the terrain 110 may include a mountainous region 112 projecting at the rear of a flat grassy region 114.

A meandering stream 115 composed of running water and/or frozen ice may extend through the flat grassy region 114 as shown. Alternatively, surface feature 115 may represent a concrete roadway that meanders through the valley. The terrain 110 may further include buildings such as 116 and trees such as 118. For purpose of example, it will be assumed that meandering feature 115 (stream, roadway, or other) has a width which is substantially less than an inter-vertex distance of a digitized terrain map (discussed below) which will be developed from the illustrated terrain 110.

Environment 100 may be illuminated by various sources of radiation during various times of the day or night. For example, the sun 120 may follow a specific arc through the sky during the day while the moon (not shown) takes a different path, or does not appear during the ensuing night. Additionally, clouds such as 122 may be located in the sky and cast shadows on the ground below or reflect IR radiations to the ground below. Yet further, structures such as upstanding building 116 and trees 118 may respectively cast shadows 126 and 128 on the ground during different times of the day.

A lay person may think that terrain 110 has only one possible view, namely that seen through the person's eye's during the respective part of day or night. However, those skilled in the art of Sensor-assisted Perception of Terrain (SaPOT) will appreciate that the imagery produced by terrain 110 can change considerably as different sensors are used and as terrain 110 experiences different kinds of weather conditions (e.g., thermal histories).

At the end of a hot summer day, for example, the sun 120 may have heated the western face of building 116 while shadow 126 and a late evening breeze may have cooled the ground on the eastern side of the building. Infrared imaging of the scene later at night may show the western face of the building 116 as a bright heat source and may further show the ground under shadow 126 as a dark, cool area. At the end of the same night, the building 116 may have cooled enough and the ground under shadow 126 may have had its temperature equalized such that the respective bright and dark contrasts are no longer seen in the IR band. Such temperature-based variance in what is seen is sometimes referred to as 'thermal loading'.

In FIG. 1, dashed lines 130 open into an exploded view of the cockpit 103 of aircraft 105. In this exploded view, a pilot 135 is seen to have has both a direct, Out-of-Window view (Ow view) 136 of the underlying terrain 110 and also a simultaneous view 137 of sensor-provided imagery 140. Such a simultaneous combination of the out-of-window view 136 and the through-the-sensor view (Sa view) 137 allows the pilot 135 to create associations within his mind between features seen in the out-of-window view 136 and features seen in the through-the-sensor view 137. Although not possible in real life, during computer simulation, the out-of-window view 136 may be that of a daylight scene while the through-the-sensor view 137 may be that of a corresponding night scene of the same terrain 110 from the same in-cockpit viewing location 103. Such a simultaneous simulation of day/night Ow/Sa views can be used to help educate the pilot-in-training 135 to better understand what he is looking at in the sensor-provided imagery 140 and why it has such an appearance. Typically, when real-time, reflex training is conducted, the simulated out-of-window view 136 will be for night time conditions and the through-the-sensor view 137 will also be for concurrent night time conditions, including any thermal loading effects that may have carried forward from the daytime history.

As indicated in box 145, the sensor-provided imagery 140 may be considered to be a weighted integration result ($\Sigma W_i$) of responses in different frequency bands 141, 142, 143, etc., of a given one or more sensors 144 to the environment 100. Typically, the sensor response bands will include one in the human visual range (VISBL) 141, one in the near infrared range (NIR) 142, and one in the far infrared range (FIR) 143. These are of course merely examples. In general, the sensor-provided imagery 140 may be a complex function of differing sensor responses in many different bands (e.g., 8 to 256 bands) and of the differing responses of differing materials of terrain 110 in the many different bands.

FIG. 2A is a block diagram of a first computer system 200 that may be used for image-rendering of sensor response in a single band. Typically the sensor is the human eye and the frequency band is therefore that of human vision.

A portion of a polygon-defined, terrain map is shown at 201. This portion 201 may correspond, for example, to mountainous region 112 of FIG. 1.

Magnification 202 shows one of the polygons of the terrain map as a triangle having three respective vertices, V1, V2 and V3.

Further magnification 203 shows that each digitized vertex, Vi can contain the following information: (a) Cartesian coordinate values Px, Py, Pz; (b) normal vector values Nx, Ny, Nz for a normal associated with the vertex; (c) color and luminance values such as R, G, B, L that are associated with the vertex; and (d) texture mapping coordinates such as T, S that are associated with the vertex.

In essence, the normal vector values Nx, Ny, Nz define the slope of the material surface at the given vertex point Vi. The color and texture information provides the response of the given material to illumination within a given frequency band (F1).

A conventional graphics-rendering computer system is shown at 220. Computer system 220 includes a relatively large disk farm 221 for receiving and storing the digitized terrain map information as indicated by transfer action 210. System 220 generally further includes a central processing unit (CPU) 224 and/or a plurality of like data processing units, an input/output (I/O) module 222 and a main memory section 225. I/O unit 222 is generally connected at least to a video display unit 240 and typically to other user interface devices (not shown) such as a keyboard, a mouse, a joystick, etc.

The main memory section 225 is relatively large and usually composed of banks of DRAM (dynamic random access memory). Other memory devices may be used instead. However, main memory section 225 is generally of a smaller capacity than the disk farm 221. Terrain map information is typically paged in (e.g., through the I/O unit 222) into main memory 225 on an as-needed basis. The CPU 224 and its associated software (not shown) may control this paging activity.

A conventional, graphics rendering processor is shown at 250. This processor 250 may be coupled to the main memory 225 by way of the system bus. Graphics processor 250 has a pipelined architecture which is comprised in sequence of: (a) a geometry engine 251, (b) a rasterizing engine 252 and (c) a frame buffer 253.

The geometry engine 251 receives three-dimensional terrain information from main memory 225. The geometry engine 251 also receives an input indicating where and at what orientation within the three-dimensional space (x, y, z) of the terrain map 210, a planar viewing window 261 is located. The geometry engine 251 further receives one or more additional inputs indicating the locations and intensities of various light sources such as 264.

A three-dimensional projecting algorithm is used by the geometry engine 251 to project onto planar window 261, a 2D image of the terrain map 210 as illuminated by the supplied lighting sources 264.

If the 2D projection algorithm is of a backward ray-tracing kind, the geometry engine 251 will typically identify a set of lines which extend perpendicularly from the viewing plane 261 to exposed vertices of the terrain map. (Some 3D objects may be hidden behind others. Thus, not all polygons are exposed.) Line 262 represents such a perpendicular of plane 261 that is drawn back to vertex V2.

The backward ray-tracing algorithm may continue by drawing another line 263 from the identified vertex (V2) to a given one of the lighting sources 264. The distances of perpendicular line 262 and reflection line 263 are determined. The angle of reflection, which angle results from the orientation of the vertex normal (Nx, Ny, Nz) relative to lines 262 and 263 is also determined. The radiated contribution of original vertex V2 to new vertex point V2' is then calculated based on these factors.

The projection results of geometry engine 251 are then forwarded to rasterizing engine 252. The rasterizing engine 252 may use interpolation algorithms and a texture memory 254 to fill in finer-detail, texture information into the interior of each 2D polygon that was projected onto viewing window 261. One result of such texturizing or filling-in of interior details for a polygon (V2", V4", V5") is shown at 265.

Frame buffer 253 receives and stores the results produced by the rasterizing engine 252 as a collection of texturized, 2D polygons. When the frame buffer 253 is filled, its contents may be output to display unit 240 by way of I/O unit 222.

The image rendering process described for FIG. 2A assumes that all light sources operate in the visible spectrum range and all material responses are merely in the visible spectrum range. However this assumption does not work for sensor-detected imagery where the sensor is responsive to multiple frequency bands and the materials of the terrain behave differently in each of the multiple frequency bands (e.g., FIR, NIR, VISBL).

Figure 2B:
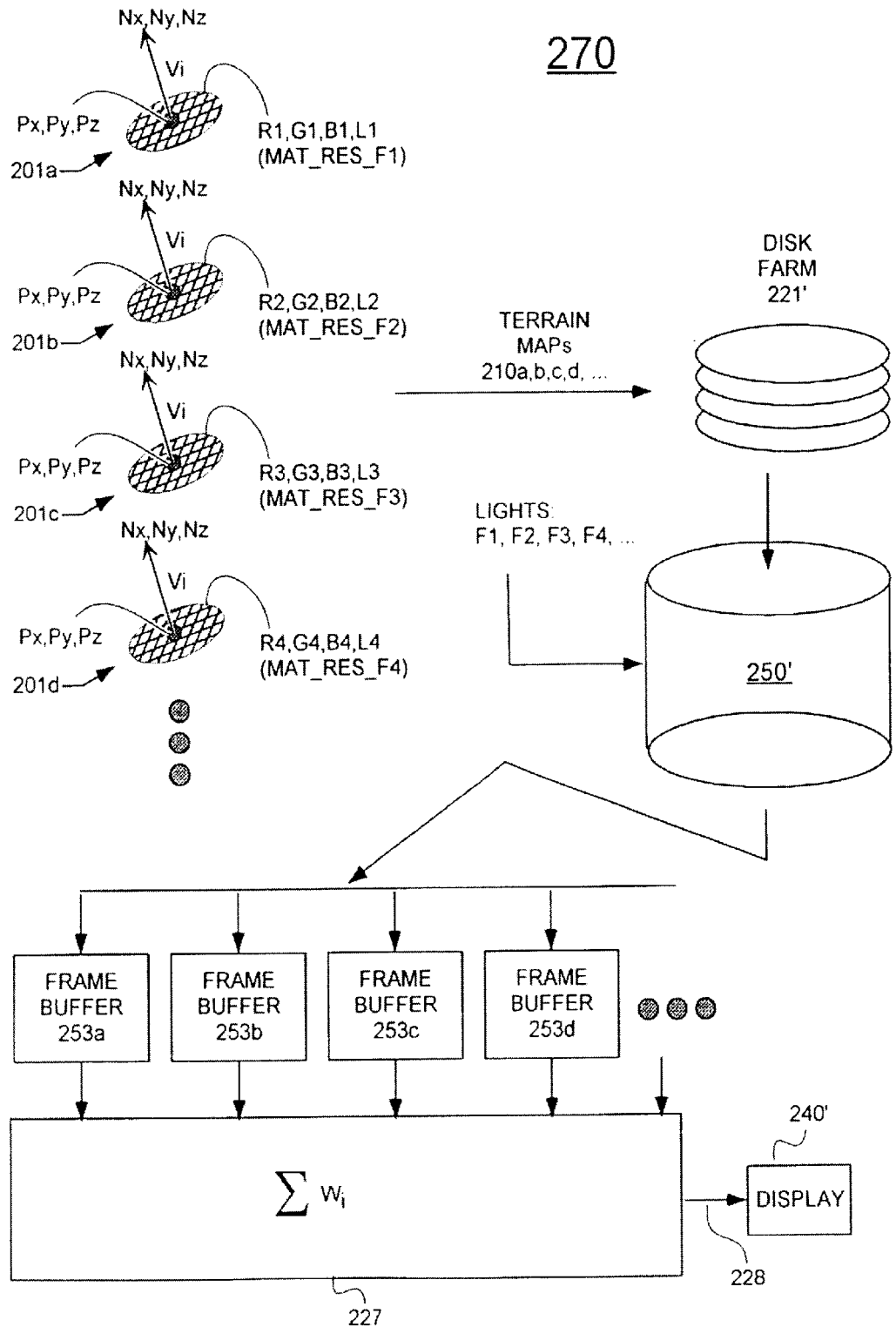
FIG. 2B is a schematic diagram illustrating a conventional, Ow/SaPOT simulating system which adds multi-band capability to the conventional, image rendering computer system.

FIG. 2B shows a multi-pass operation 270 which re-uses the basic architecture of FIG. 2A to produce image renderings for sensors that respond in multiple frequency bands. For each one of corresponding frequency bands F1, F2, F3, F4, etc., a corresponding terrain map 210a, 210b, 210c, 210d, etc., is generated by re-encoding the original terrain map 210. An exemplary 3D vertex for each of these bands is shown respectively at 201a, 201b, 201c, and 201d. The respective material responses to each of these frequency bands is represented by the corresponding designation MAT_RES_Fi, where i is equal to 1, 2, 3, 4, etc.

Each of terrain map 210a –210d is passed in its turn from disk farm 221' and through pipeline processor 250' to produce a corresponding one of frame buffer results 253a, 253b, 253c, 253d, etc. At the same time, a corresponding definition of the lighting sources within the given frequency band Fi is submitted to pipelined processor 250'.

When all the relevant frame buffer results 253a–253d have been filled with texturized information, a weighted integrating unit 227 may combine the results as appropriate for a given sensor to thereby produce a composite frame buffer image 228. This composite frame buffer image 228 is then supplied to display unit 240' at an appropriate time. In an alternate embodiment, each of frame buffer results 253a–253d, etc. may be alpha-blended or otherwise accumulated over time into a single frame buffer memory, whose data is then rendered on display unit 240'.

In order to produce real-time moving pictures of a navigated journey through a given terrain (e.g., 201) with Sensor-assisted Perception of the Terrain, process 270 is executed repeatedly, to generate one composite frame 228 after another and to thereby create a movie sequence of composite frames. Needless to say, this process is computationally intensive and calls for expensive, high speed computing hardware.

The size of disk farm 221' can grow astronomically with increases in the number of frequency bands to be considered, numbers of sensors to be considered, and numbers of different terrains that are to be navigated over.

Figure 2C:
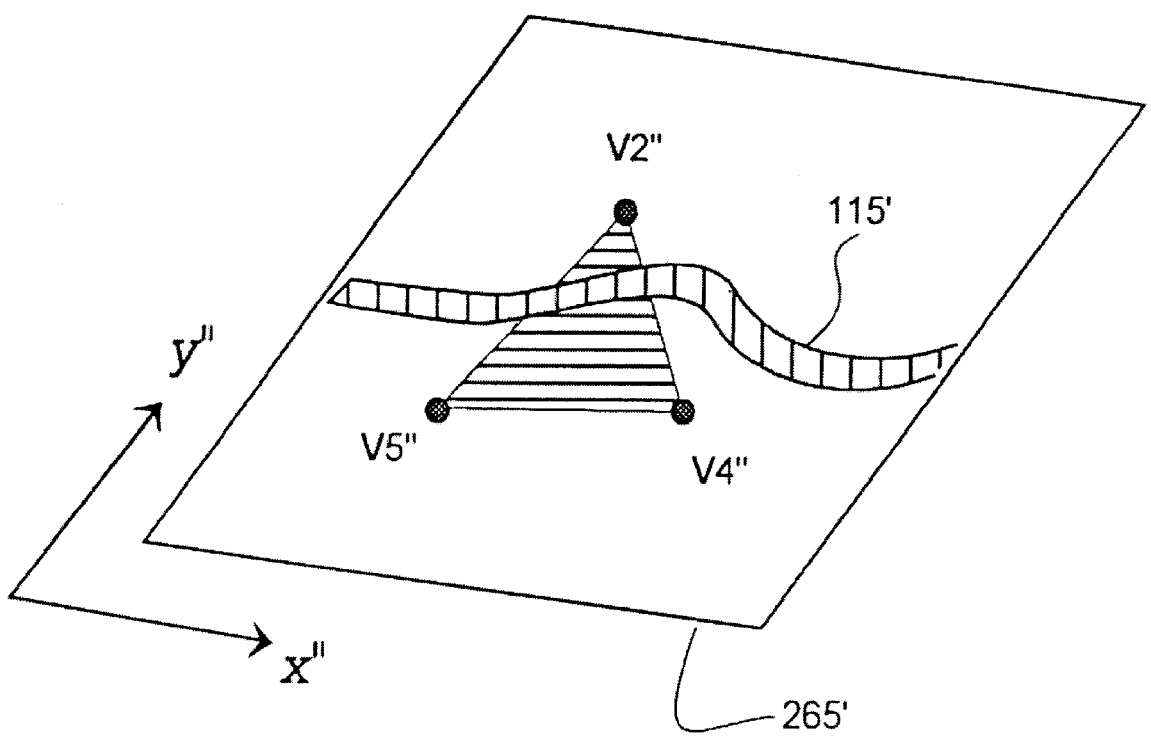
FIG. 2C illustrates a resolution problem encountered in conventional Ow/SaPOT simulating systems.

There is yet another problem. Referring to FIG. 2C, consider a situation 280 wherein a small-width feature 115' of the overall terrain 210 snakes through between a set of projected vertices (e.g., V2", V4", V5") such that the material characteristics of the snaking-between feature 115' are not captured by the geometry engine as it projects corresponding vertices V2', V4', V5' onto the viewing plane (261 in FIG. 2A). In such a case, rasterizing engine 252 will also fail to capture the snaking-between feature 115' because the rasterizing engine 252 uses only the vertices V2', V4', V5' projected by the geometry engine 251 as inputs for the rasterizing process.

By way of an example, assume that the snaking-between feature 115' is part of the meandering stream 115 of FIG. 1. If the material of this meandering feature 115' is highly reflective in a given frequency band, but the geometry engine 251 misses it, then it will not appear in the rendered, composite image of display 240' (FIG. 2B). For certain missions, the identification and display of such finely-dimensioned features (e.g., 115' ) may be critical. A failure by the OwPOT/SaPOT simulating system to show such critical features in the SaPOT part of its operations is generally not acceptable. An improved system is needed in which finely-dimensioned features will be captured even if they happen to fall between the vertices of the 3D terrain map.

FIG. 3 illustrates a system 300 in accordance with the invention. Like reference symbols and numbers in the "300" century series are used for elements of FIG. 3 which correspond to but are not necessarily the same as the elements represented by similar symbols and reference numbers of the "200" century series in FIG. 2A. As such, an introductory description of the elements found in FIG. 3 is omitted here.

In FIG. 3, a terrain map 310 of multiple resolutions is provided. One level of resolution, which is referred to here as the 'per-vertex' level, is provided for use by the geometry engine 351 within graphics pipe 350. A second, finer level of resolution, which is referred to here as the 'per-texel' level, is provided for use by the rasterizing engine 352.

Terrain normals are provided both at the 'per-vertex' level and at the 'per-texel' level. The per-vertex provision is represented in magnification 303 as θ, φ (theta and phi) where these define the normal direction for the material surface at the respective vertex in terms of two orthogonal angles of a given, spherical coordinates system. Other representations of the normal direction, such as in terms of normalized x,y,z Cartesian vector coordinates may be used if desired.

The per-texel provision of the terrain normals information is represented as a first input, N=θ, φ to a set of lookup tables (LUT's) 355. These LUT's 355 will be described below in more detail, when we get to FIG. 4.

Terrain materials information is provided at the 'per-texel' resolution. The per-texel provision of the terrain materials information (M) is represented as a second input, from a terrain texels-defining memory 354 to LUT's 355.

As seen in region 365, each resulting Texel value can be an arbitrary function, F(G, D, f(N, MAT, . . . )), of a number of inputs including the general projection angle G, the projection-to-viewing-window distance D, the per-texel, terrain normal information (N) and the per-texel, terrain material information (M).

Each resulting Texel value can further be a function, F( . . . , f(N, MAT, SKY)), of a per-texel, SKY MAP value (S). In FIG. 3, the SKY MAP information, S is seen to define a third, per-texel, input that is derived from SKY data 364 and supplied to LUT's 355. SKY data 364 may be modulated by per-texel, shadow information 356.

Each resulting Texel value can further be a function, F( . . . , f(N, MAT, SKY, SENSOR)), of supplied SENSOR Response Parameters (P). The SENSOR Response Parameters (P) are seen to come from source 357 and are essentially constant relative to the x" and y" data 367 that drives raster engine 352.

In the illustrated embodiment, geometry engine 351 does not have to calculate distance 363 between the sky and vertex Vi, or the angle made between the two. Geometry engine 351 merely calculates distance 362 (D) between vertex Vi and its 2D, counterpart Vi' (on plane 361). Geometry engine 351 also calculates the general angle (G) between line 362 and the per-vertex normal, θ, φ. These calculation results define the projected-onto-viewing-plane and to-be-filled polygons 366 are passed on to rasterizing engine 352 for filling. The G and D information may be used to modulate the internal function, f(N, MAT, SKY, SENSOR) using a cosine law or an equivalent for predicting intensity contribution from non-perpendicular surfaces.

Rasterizing engine 352 fills each of the projected, 2D polygons with a plurality of texel values. The driving inputs 367 are the, x and y coordinates or address of each successive texel inside each successive polygon 366. The resulting per-texel value is a function, f(N, MAT, SKY, SENSOR), of the provided per-texel, terrain normal information (N); of the provided per-texel, terrain material information (M); of the provided per-texel SKY/shadow information (S); and of the provided SENSOR parameters values (P). Note that the source 357 of the SENSOR parameters values (P) can be provided as a separate unit and coupled to the P input of LUT's 355 for programming, the LUT's accordingly as will be seen shortly. Filled-in polygons 3661" are then sent to frame buffer 353 for compositing with other information and/or rendering on a subsequent display unit (not shown).

Although the above discussion might imply to those skilled in the art that the geometry engine 351 first generates the to-be-filled polygons 366 and that the rasterization-assisting LUT's 355 are to be used afterwards for assisting the rasterizing engine 352 in filling in the polygons 366, such a sequence of operations is not necessary. The rasterization-assisting LUT's 355 transform the S, M and N input streams in accordance with the supplied sensor parameters, P. The feeding-in of the S, M and N input streams into the rasterization-assisting LUT's 355 is not directly tied to the polygon-generating actions of the rasterizing engine 352. The feeding-in of the S, M and N input streams into the rasterization-assisting LUT's 355 and the production by LUT's 355 of resulting output streams can occur at any time up until the per-texel texturizing is finalized inside the geometry-produced polygons. In other words, LUT's 355 may be positioned at any desired location in the illustrated data flow from disk farm 321 up until frame buffer 353 as long as the outputs of LUT's 355 are available for filling texture data into respective texel locations in the frame buffer 353. If LUT's 355 produce more output points than is needed for filling in a particular polygon 366 that is afterwards produced by the geometry engine 351, that is fine. The excess output can be cropped away after the particular polygon 366 is generated.

Figure 4B:
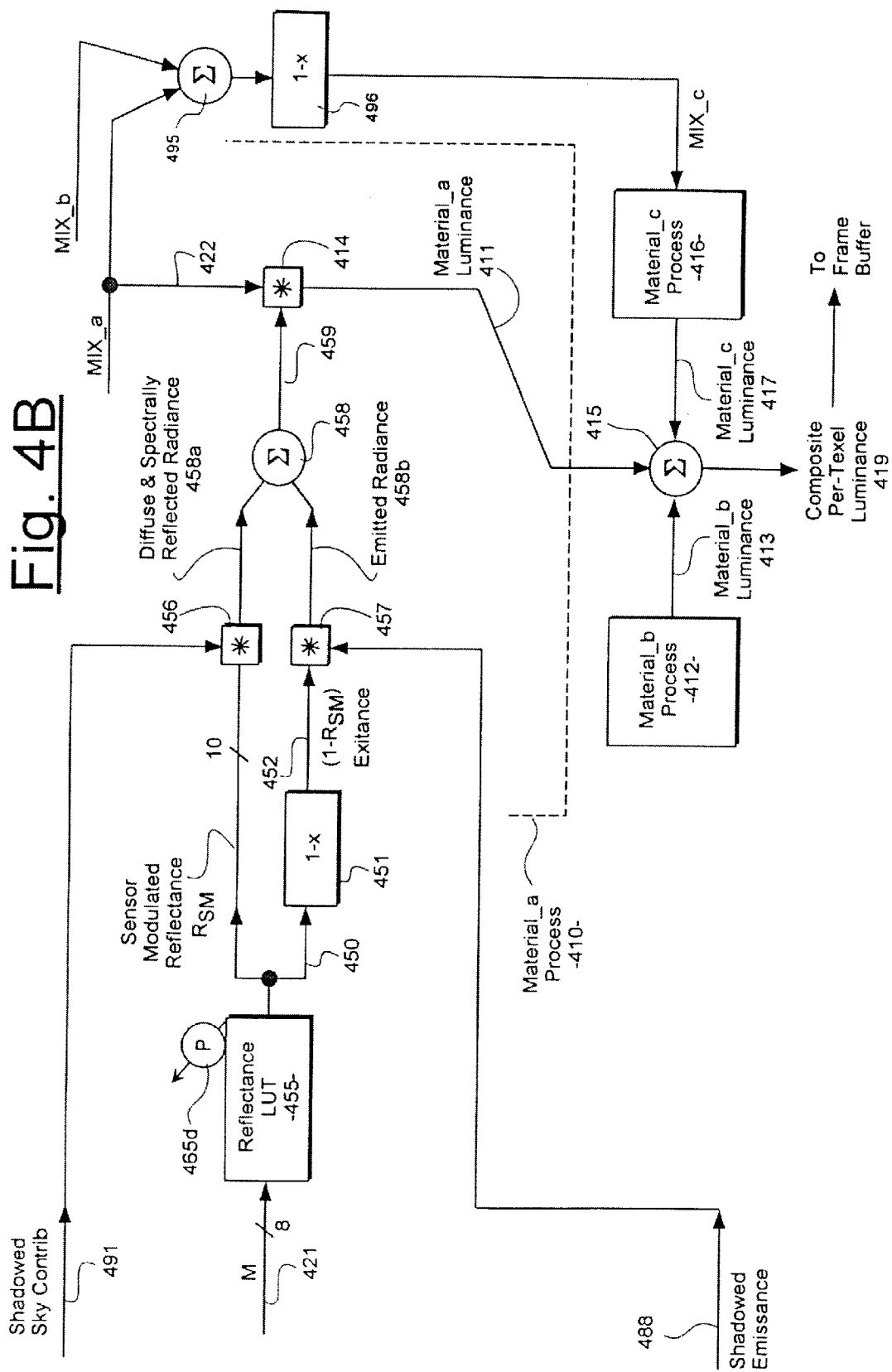
FIG. 4 is a schematic diagram of a luminance generator within a rasterizing portion of a simulating system in accordance with the invention.

Another point here, although this will be clearer when we get to the detailed discussion of FIGS. 4A-4B, is that it is within the contemplation of the invention to use data other than direct, normal data N for defining the surface slope of each terrain texel. Normal data, N, is preferably provided in terms of two spherical angles, θ, φ, because this a quickest and most compact way of precisely defining an upwards look toward the sky 364 on a per-texel basis without suffering loss of precision due to sine/cosine transformations. However, the normal definitions could be given in terms of three normalized vector quantities such as : $n_X$, $n_Y$, and $n_Z$ if desired. Alternatively, the per-texel normal could be calculated from a per-texel surface tangent vector given as dx/dZ and dy/dZ where Z is elevation. Alternatively, the per-texel normal could be calculated in terms of dZ/dx and dZ/dy from a providing of two or more, per-texel elevation values, e.g., $Z_1$ and $Z_2$ at relative, inside-the-texel points such as $x_1,y_1$ and $x_2,y_2$ within each texel. Alternatively, the per-texel normal could be calculated in terms of dZ/dx and dZ/dy from a use of one elevation value per-texel and one or more elevation values provided on a per-texel basis for neighboring texels. Thus, there are a variety of different techniques that can provide the effect of performing an upwards look toward the sky 364 on a per-texel basis. The illustrated way of providing normal data, N, in terms of two spherical angles, θ,φ, on a per-texel basis is the preferred, but not only way.

FIG. 4 is provided across multiple sheets (FIGS. 4A, 4B, etc.) as indicated by the legend on the first sheet which shows the assembly of FIG. 4 from the multiple sheets (FIGS. 4A, 4B, etc.). A LUT-based, terrain texturizer 400 in accordance with the invention, which apparatus is also referred to as a luminance generator (LUM GEN) 400 will now be described.

Implementation of the illustrated, luminance generator 400 may be carried out with discrete hardware components or with software components executing in an appropriate one or more computers or with combinations of both. The speed versus cost trade off of implementing with hardware versus uni-processor or multi-processor software are known to those skilled in the art. After reading the present disclosure, it will be within the abilities of those ordinarily skilled in the art to write computer programs and store the same on computer storage media and/or transmit the same as instructing signals for instructing programmable machines to perform the operations described herein.

It will be seen shortly that, with respect to critical speed paths for painting the interior pixels or texels of respective polygons, the corresponding per-texel data signals will flow through one or more lookup tables in a manner that removes complex computations from the serial, bottlenecking paths of the polygon painting algorithm. The output of the LUM GEN 400 is a stream of composite, per-texel luminance signals 419 which are to be painted into, or blending-wise overlaid on, respective, texel-representing locations of a frame buffer. The so-painted frame buffer can then represent (simulate) the imagery that will be seen by an observer (e.g., 135 of FIG. 1) looking through a given sensor (144) from a given location and angle of look, at a given terrain (110, 301).

Coordinate signals that represent the coordinates (e.g., x", y") of each of plural and successive texels are supplied by a texel-address generator 467 to address inputs of a terrain-texture map memory 454 for processing. The corresponding memory output signal 420 for each supplied, texel-address (x", y") is referred to here as a texel record or as a Per-Texel Output Signal (PTOS). It is understood that address generator 467 may be rapidly stepping through successive texels of a to-be-filled polygon such as triangle 366 of FIG. 3 or through a broader area that approximates a to-be-generated polygon such as triangle 366. A different PTOS 420 will generally be generated for each successive texel. The terrain-texture map memory 454 can be implemented in many different ways, including but not limited to, ROM, SRAM, DRAM, magnetic hard disk cached into DRAM, optical disk cached into SRAM, and so forth. Such a terrain-texture map memory 454 can be placed as desired, in a variety of positions along the data flow path of the geometry engine or rasterizing engine.

The data contents of the terrain-texture map memory 454 can be generated in many different ways, including but not limited to, using a programmed computer to pre-combine all data of each texel record (420, described below) for storage of each texel record as a whole or by obtaining parts of each texel record on-the-fly either from respective and plural storage devices or with some of the data (e.g., normal vector data) of each texel record being computed on-the-fly from appropriate, precursor data. Elements 467 and 454 may constitute parts of a programmable or instructable machine that is programmable or instructable by an instructing signal (or by software carried on a computer-readable media) to generate a stream of Per-Texel Output Signals.

In one embodiment, each PTOS consists of 64 bits per texel and has a data structure such as shown at 420 in FIG. 4A. Other structures for texel records and other numbers of bits per texel are, of course, within the contemplation of the invention. The speed and cost trade off are understood by those skilled in the art. The terrain-texture map memory 454 should be capable of storing and quickly outputting the respective PTOS's 420 of large numbers of potentially addressable texels (e.g., $10^6$, $10^9$, or greater). As more bits are added to each PTOS 420, the size and cost of memory 454 tend to grow significantly larger and its data read speed tends to become slower. On the other hand, if certain bits are deleted from each PTOS 420, the observer (135) of the imagery projected on the video display unit (e.g., 340 of FIG. 3) may notice a significant reduction in image resolution and/or accuracy. The bits per field described herein were found to provide a good balance between available, texture memory (454) and desired image resolution. It is understood that more bits per field may be used as memory technology improves and/or as demand for higher resolution justifies.

The main point to remember here is that we are not merely trying to paint high resolution images here (although an embodiment of the invention can be so limited). We are attempting to produce high resolution and realistic, real-time moving pictures of a pilot-navigated journey (a simulated journey) through a simulated terrain, where the simulated terrain closely mimics a real-world terrain, and where the moving pictures closely depict what would be seen as sensor-provided imagery (140 of FIG. 1) in the real-world counterpart of such a journey.

In the illustrated PTOS data structure 420 of FIG. 4A, a first, 8-bits long field 420a, defines a first Material IDentification index that is referenced here as, MID__a. This material index value (MID__a) refers back to a materials descriptor array 405. Array 405 lists up to 256 different kinds of materials. The illustrated examples include water, ice, brick, sand, clay, wood, grass, etc. One column of array 405 associates a specific material with each unique materials index value, MID. Other columns may associate further properties with each MID value, as pointing to specific spectral response curves (not shown) of the respective materials. Larger versions of materials descriptor array 405 are possible if the MID fields (e.g., 420a,b) of the PTOS structure 420 are made larger, for example 16 bits per MID, to thereby have more bits per texel. Conversely, the descriptor array 405 may be made smaller if the number of bits per MID value are made smaller. The illustrated, materials descriptor array 405 does not have to be an included part of the luminance generator 400. Rather, array 405 may be referenced or otherwise used when certain lookup tables of LUM GEN 400 are programmed, as will become clearer later in the description.

A second materials index field 420b, of the PTOS structure 420 references a second material of materials descriptor array 405. The contents of field 420b, are denoted as MID__b. A third, 8-bits long field of PTOS structure 420 contains a similar third index, MID__c for defining a third one of the plural materials listed in materials descriptor array 405. If desired, in an alternate embodiment the PTOS can have less or more than the illustrated number of three MID fields, with each such MID field being capable of referencing a respective one of a large set of selectable materials (e.g., 256, 512, or more selectable materials).

A fourth field (420d,) of the PTOS structure 420 is 8-bits long and defines a fractional mixture amount for the first material (MAT__a, e.g. wood) that is identified by index value MID__a (420a,). This mixture amount can be any value in the range of 0–100% as is ascribed to the MAT__a content of the currently addressed texel, T(x,y). A fifth, 8-bits long field of the PTOS data structure 420 defines a second fractional mix value for the second material (MAT__b, e.g. leaves) as identified by MID__b. There is no need for including in PTOS 420 a field representing the last mixture amount (MIX__c) because that remainder value is defined as unity less the sum of the expressed fractions (e.g., those represented by MIX__a and MIX__b; in other words: MIX__c=1-MIX__a-MIX__b). Note the below-described, elements 495 and 496. If desired, each MIX field can have more or a fewer number of bits.

For a given, real world terrain, the content mixture value (e.g., MIX__a and MIX__b) may be obtained from stereoscopic spectral analysis of satellite reconnaissance data or the like. In such a reconnaissance process, two or more, spaced-apart radiation sensors aboard one or more orbiting satellites are pointed at each successive terrain texel. Spectral radiation information is gathered for that pointed-at texel at the same time that surface slope and topographic elevation data is gathered for that texel. The real world dimension of the side of a square texel in a given terrain map can vary with mission specifics and/or satellite surveillance capabilities.

Typically such dimensions will be at least one order of magnitude smaller than (1/10th or less of) the inter-vertex distance of the corresponding terrain map. So if the exemplary, 100 m inter-vertex distance of above is used, the texel side size will be about 10 meters or less and the real-world area covered by such a terrain texel will be about 100 square meters or less. A terrain texel of much poorer resolution may be as big a 33 meters on each side and may thereby represent a real-world area of 1089 square meters or less. A terrain texel of slightly better resolution may be about 25 meters on each side or may be rectangular and still represent a real-world area of about 625 square meters or less.

Analysis of the spectral peaks and gaps in the collected, per-texel data gives comparative probabilities or other indications as to what material or set of materials the texel may contain. For example, if such a spectrally-analyzed texel (that is for example, 5 m wide) covers part of the leaves, trunk, and root soil of a tree, the spectral analysis results may come back to indicate a 60% probability that the texel material is chlorophyl containing vegetation, 30% probability that it is wood, and 10% probability that it is something else such as clay. The resulting MIX_a, MIX_b and MIX_c values would then be assigned to that texel, T(x,y), as follows: 0.60, 0.30 and 0.10 respectively for the leaves, wood and clay soil materials. The resulting MID_a, MID_b and MID_c index values that would be assigned to that texel, T(x,y), would be those pointing to leaves, wood and clay respectively. Other techniques for defining the MIX_a, MIX_b and MIX_c values and corresponding MID_a, MID_b and MID_c index values of each texel, T(x,y), may be used as appropriate. Satellite-borne spectral-sensor reconnaissance is just one example.

A sixth field (420f) of PTOS structure 420 consists of 8 bits and defines the spherical-coordinates angle, θ (theta) for the surface normal vector associated with the addressed texel, T(x,y). Similarly, a seventh field of PTOS structure 420 consists of 8 bits and defines the spherical-coordinates angle, φ (phi) for the normal vector associated with the addressed texel. The 16-bits long combination of the θ and φ fields are referenced herein as the normal, or N signal 423. Of course, it is within the contemplation of the invention to use a larger or smaller number of bits for one or both of the θ and φ fields. The memory-size/speed factors described above apply.

An eighth field of the PTOS data structure 420 consists of 4 bits and represents an amount-of-shadow-on per-time-slot attribute. This shadow/time attribute is referenced herein as signal 424.

The remaining 4 bits of the 64-bits long PTOS structure 420 represent ancillary texture data which is not related to the luminance generation process of the luminance generator 400 described here. Other data fields that contain per-texel information may be added to the PTOS data structure as desired. The PTOS data structure shown at 420 is a non-limiting example.

It is also within the contemplation of the invention to use fewer fields. At minimum, a PTOS data structure in accordance with the invention can be constituted by just two fields: one for identifying a detection-wise relevant material on the surface of a corresponding terrain texel so that reflectance and/or emissance can be determined on a per-texel basis; and a second field for identifying a vector that is substantially normal (perpendicular) to the surface of the corresponding terrain texel so that an upwards look toward an illuminating sky-dome can be carried out on a per-texel basis.

In one embodiment, each bit of the shadow time signal 424 is associated with a respective time of day, such as morning, midday, evening and night. If desired, more bits can be used and the day can be divided into a larger number of finer resolution time periods. If the shadow bit of a given time period is at logic '1', that indicates the corresponding texel is being 100% shadowed (blacked out) by some other object during the respective time period. If the shadow bit is logic '0', then shadowing is not occurring during that respective time period. Unit 431 represents a simulated clock that supplies a signal indicative of the present time of day to multiplexer 434. A delayed version 423 of the time of day signal is supplied to multiplexer 435. Depending on time of day, multiplexer 434 will select a corresponding one of the four bits in the shadow time signal 424 and output an inverted version (100% minus shadow strength) of that selected signal as a CSN signal (Current Shadow Not). Similarly, depending on the delayed time of day signal 432, multiplexer 435 will select a corresponding one of the shadow time bits and output an inverted version (100% minus shadow strength) of that signal as an OSN signal (Old Shadow Not). Although just one bit is being used per time slot to indicate shadow strength in that slot as being either 0% or 100%, it is within the contemplation of the invention to use more bits and thus define shadow strength with finer resolution, such as 0%, 33%, 66% and 100% if two bits are used per time slot.

The 16-bits wide, normal signal 423 (N) is supplied to the 16 address inputs of each of plural and swappable lookup tables (LUT's), 464a, 464b, etc. (only two shown). One of plural LUT's 464a, 464b, etc., may be in an 'inactive' mode wherein its addressable contents can be updated without interfering with on-going lookup functions. At least one of plural LUT's 464a, 464b, etc., should be in an 'active' mode wherein its addressable contents are being actively addressed by a continuously running stream of per-texel, N signals 423. The active one of the plural LUT's, 464a, 464b, etc., will be referred to here as a 'sensor-modulated (SM) current sky-map LUT' 464. Methods for defining the addressable contents of the SM current sky-map LUT 464 will be described later.

For now, the following simplified explanation is given. One may think of each instance of the N signal as a vector that points perpendicularly from the surface of a corresponding and current, terrain texel, T(x,y), up to the sky, using the terrain texel's normal angle for such pointing, in order to get a reading of the amount of sky light, or other sky-dome illumination that falls upon that texel. (See FIG. 6A.) The reading may further factor into itself the fraction of light that will reflect off the material surface of the texel (which reflectance factor may, of course, depend on the material content of the terrain texel's surface). The reading may further factor into itself the spectral content of reflected light that will be detected by the in-use sensor (e.g., 144 of FIG. 1) for observation by the user (135) of the sensor. LUT output signals 466a and 466b can form part of that kind of reading.

The programming of the addressable contents of sky-map LUT 464 includes making the contents responsive to sensor-related parameters (P). This content-responsiveness to sensor parameters is represented by the circled-P symbol 465a. There is a sensor independent, sky map 440 that defines the intensity and types of lighting sources in the sky. Some of these lighting sources may emit radiations that are outside of the detection range of the in-use sensor. The in-use sensor (e.g., 144 of FIG. 1) may be more sensitive to some wavelengths than to others. Circled-P symbol 465a represents a kind of filtering of the current sky map 440 to thereby produce contents of a sensor-modulated (SM), current sky map LUT 464. This process will be further detailed when the description of FIGS. 6A–6D is undertaken.

In one embodiment, an active-selecting multiplexer 466 is provided for designating one of sky map LUT's, 464a, 464b, etc., as the active LUT and for passing the 10 bits-wide output signals 466a, or 466b, etc. of that designated LUT on as a sky-radiance signal 460. The addressable contents of one or more of the inactive sky map LUT's, 464a, 464b, etc., may be updated by updating mechanism 465a at the same time. In an alternate or supplemental embodiment, the active one of sensor-modulated, sky-radiance signals 466a, 466b, etc., is stored in a FIFO buffer (first in first out buffer, not shown) so that a stream of already defined, sky-radiance signals 460 can continue to flow for subsequent processing even while the corresponding sky-map LUT 464a, etc., is being updated to account for changes (463) in the sky scene.

Note that the lookup input data, namely, the N signal 423 is sensor independent. The N signal 423 may be supplied without knowing what constitutes the contents of lookup tables 464a, 464b, etc., or which of those sky tables is being designated as the currently-active, sky map LUT 464.

Besides sensor parameters (P), another factor that can affect the addressable contents of the active sky map LUT 464 is the time of day. Time update unit 431' supplies update information 463 for programming into the current sky map 440. The data of the updated, sky map memory 440 may then be passed through an appropriate, sensor parameter filter 465a for loading into a corresponding, SM sky map LUT such as 464a, 464b, etc. The update information 463 can represent movement of the sun or moon across the sky and/or movement of clouds and/or creation and diminution of other lighting artifacts (e.g. exploding flares).

In essence, application of the N signal 423 to the active SM sky-map LUT 464a, 464b, etc., represents a momentary looking up into the sky from the position of the terrain texel that is currently being considered so as to get a reading of the sky-dome contribution that will directly (perpendicularly) impinge on that terrain texel. The application of the N signal 423 to the active SM sky-map LUT 464a, 464b, etc., further represents an assumption that the in-use sensor is present at, and is looking straight down at that terrain texel so that we getting a reading back of what would be seen through the eyes of the sensor under this assumption. This is why the sky-map LUT 464 is characterized as being "sensor-modulated " (SM).

Of course, when the frame buffer is finally painted to represent what is seen from viewing plane 361 (see FIG. 3), the in-use sensor will generally not be simulated as being so-located directly on top of, and looking straight down at the corresponding terrain texel. Instead, the in-use sensor will generally be simulated as being spaced away by a pilot-determined, distance 362 (D) and it will also generally be angled relative to the terrain texel by a pilot-determined, angle, G.

The present discussion is not accounting in detail for these distance and angle factors. It is left to the geometry engine 351 to calculate the general angle (G) of viewing and to apply a cosine-law (e.g., cos(G)★f(N)) or other appropriate transformation function to the direct, head-on sensor reading to thereby more accurately define what the sensor will pick up when looking at the terrain texel along observation line 362. It is further left to the geometry engine 351 to calculate the separation distance D and apply a reciprocal square-law (e.g., f(N)/D★★2) or other appropriate transformation functions to the direct, head-on sensor reading to thereby more accurately define what intensity the sensor will read when looking at the terrain texel from a position that is a distance, D away. If the geometry engine 351 (or another means) determines that, because of one or both of the viewing angle G and viewing distance D, the perceived level of resolution in the frame buffer will be different than that of one buffer pixel per terrain texel, then the geometry engine 351 and/or the rasterizing engine 352 (or another means) can perform additional computational steps for selectively blending together or otherwise manipulating contributions from neighboring terrain texels so as to provide the impression that the terrain texels are far away and not discernable as individual entities. For some types of sensors such a combining of contributions from multiple terrain texels can be highly nonlinear. For example, if one of four terrain texels in a square area is reflecting or emitting brightly while the other thee are relatively dark, the sensitivity of the sensor may be such that it nonlinearly amplifies and clearly picks out the one bright texel despite its being surrounded by dark texels and despite its being far away. Again, these functions are generally outside the scope of the LUT-based operations being described herein, and as such they will not be further detailed even though they can be carried out as supplements to the LUT-based operations described herein. The primary understanding that is to be taken from the present discussion is that sensor response can be quickly and accurately simulated down to the per-texel level of resolution.

In FIG. 4I the output signal 466a or 466b (sky radiance) of the active sky-map LUT represents the integrated contribution of the entire sky to the given texel at the time of the direct, through-the-sensor look at that terrain texel. The contribution is modulated by the spectral response 465a of the sensor-in-use even though such a sensor is not in the direct line of sight between the texel and the sky. Ultimately, as the sky contribution is reflected from the material surface of that texel and passed into the sensor, the reflected contribution will be modulated by the spectral response 465a of the sensor-in-use. The compensating transformation is being carried out here sooner rather than later. It does not matter from an arithmetic point of view whether the per-frequency multiplication by the spectral response (465a) of the sensor-in-use occurs early in the development of the texel luminance signal 419 or at the end of the definition of the texel luminance signal. Thus, for sake of convenience and compactness, we do it sooner rather than later.

The active sky-radiance signal 460 is next supplied to multiplying unit 461. A second input of multiplier 461 receives the CSN (Current Shadow Not) signal. If CSN is equal to 100%, then 100%of the active, sky-radiance signal 460 gets through to the input of summing unit 462. If CSN is 0%, then signal 460 is blocked. If more than one bit is used to define CSN, then finer levels of resolution for shadowing effect may be provided.

The shadowing operation compensates for various kinds of opaque or other objects that may come to be interposed between the texel normal (N) and the current sky, where this shadowing action cuts off all or part of the contribution from the current sky map.

Aside from shadowing, there may be some quantity of diffuse or ambient lighting that contributes to the terrain's texel-under-consideration, T(x,y). This ambient amount of additional lighting is stored in memory 468 and is supplied therefrom to summing unit 462. The contents of ambient memory 468 may be programmed to account for sensor parameters as indicated by symbol 465b. The contents of ambient memory 468 may be further updated by slow-changing source 469 as ambient weather conditions change. For example, a continuous cloud cover may come into place over the simulated scene and provide a diffuse source of lighting in certain spectral bands (e.g., NIR). The weather updating unit 469 would reprogram ambient memory 468 to account for such changes. Because ambient memory 468 generally contains only one value (10 bits wide) for the in-use sensor, it can be updated very quickly. If desired, a FIFO buffer may be interposed between units 468 and 462 or a multiplexer of similar function to 466 may be interposed.

Note that various variables such as weather updates 469 and time updates 431, 431' are very slow changing in relation to the much more quickly changing texel address information 467 (x, y). Many millions or billions of terrain texels will usually be processed by luminance generator 400 before a time update or weather update occurs. Accordingly, the normal N signal 423 may be seen as the fast changing variable while other factors such as time update and weather update are relatively constant in comparison.

As the contents of the current sky map 440 change with relative slowness, over time, such sensor-independent updates are sent to a history-blending unit 472. The blending unit 472 receives a faded version of a previous solar-loading history from an active one of solar LUT's 474a and 474b. Multiplexer 477 reads the contents of the active solar LUT. Fading unit 478 multiplies the previous history values (10 or more bits per addressable location) with a fading factor which is typically less than unity. The summed result of the faded old history and the current sky map are then used to reprogram an inactive one of solar-loading LUT's 474a, 474b, etc. (only two shown) in response to timed update commands 473 sent from a timing unit such as 431'. Element 475 represents the routing of the content overwrite data to the inactive one of the solar-loading LUT's 474a, 474b, etc. That inactive solar-loading LUT may be the next one to be selected as active by a second active-selecting multiplexer 476.

The normal N signal 423 is supplied to a 16-bit input of the active one of solar-loading LUT's 474a, 474b, etc. In the illustrated embodiment, the second active-selecting multiplexer 476 designates one of solar-loading LUT's, 474a, 474b, etc., as the active LUT and passes the 10 bits-wide output signals of that designated solar-loading LUT on as a thermal loading signal 470. The addressable contents of one or more of the inactive solar-loading LUT's, 474a, 474b, etc., may be updated by updating-mechanism 473/475 at the same time. In an alternate or supplemental embodiment, the output stream of the active one of solar LUT's 474a, 474b, etc., is stored in a FIFO buffer (not shown) so that a stream of already defined, thermal loading signals 470 can continue to flow for subsequent processing even while the corresponding solar LUT 474a, etc., is being updated to account for changes (473) in the sky scene.

The active, thermal-loading signal 470 is next supplied to multiplying unit 481. A second input of multiplier 481 receives the OSN (Old Shadow Not) signal. If OSN is equal to 100%, then 100% of the active, thermal load signal 470 gets through to a subsequent temperature LUT 484. If OSN is 0%, then signal 470 is blocked. If more than one bit is used to define OSN, then more and finer levels of resolution for shadowing effect may be provided.

The shadowing operation of multiplying unit 481 compensates for various kinds of objects that may have come to be interposed between the texel normal (N) and the sky, where this historical shadowing action is one that cut off all or part of the contribution from the old sky map and thereby allowed for historical cooling. Current shadowing is deemed to be insubstantial to the historically-accumulated, thermal loading of the given addressed texel, T(x,y), and is thus not accounted for in this embodiment. In alternate embodiments, a weighted version of the CSN signal (e.g., 25%) may be mixed with a weighted version of the OSN signal (e.g., 75%) to define the shadowing factor for multiplying unit 481.

Aside from historical shadowing, there may be some quantity of diffuse or ambient heat that contributes to the energy content of the texel-under-consideration, T(x,y). This ambient amount of heat is stored as a bias level that is added to, or subtracted from the addressable contents of temperature LUT 484. The bias level can account for cooling by ambient air (fluid) or wind (currents) or for heating by ambient fluids.

In addition to the 10 bits wide, loading signal 470, temperature calculating LUT 484 also receives as part of its 18 inputs, the 8 bits wide, M signal (421). The resulting, 8 bits wide, output signal 485 of LUT 484 represents the temperature of the corresponding texel of the terrain map due to energy contributions or reductions provided cumulatively over time. The combined address-inputs of the old-shadowed, solar-loading signal 482 and M signal 421 therefore cause the temperature LUT 484 to generate temperature signals 485 that represent the current temperature of the material-under-consideration at the given texel. It has been found that 8 bits provides sufficient resolution for the temperature signals 485. More bits may be used if greater resolution is desired. The temperature signals 485 are optionally pipelined into FIFO 487. This allows outputs to continue streaming through even when the temperature LUT 484 is being reprogrammed to accommodate for changes in ambient weather, such as ambient temperature, wind, etc. Reprogramming unit 489 changes the addressable contents of temperature LUT 484 as appropriate.

Black body LUT 486 receives the output signal of FIFO 487 (or of LUT 484 if 487 is left out) and generates an emissance signal 488 that represents the black body emissance of the addressed texel, T(x,y), as seen through the spectral-sensitivity bands of the sensor being simulated. Symbol 465c represents the programming of the addressable contents of LUT 486 to define this sensor-modulated, and historically-shadowed emissance signal 488.

The material of the texel-under-consideration, T(x,y), will have a particular spectral reflectance. This reflectance will be filtered by the spectral response of the sensor that is being simulated because the sensor picks up its radiation input after the latter is reflected by the texel's material. Accordingly, it is seen that a reflectance LUT 455 is provided for receiving, as its address inputs, the 8 bits of the M signal 421 (material index) and for outputting a corresponding, sensor-modulated reflectance signal ($R_{SM}$) 450. The addressable contents of reflectance LUT 455 are programmed in accordance with sensor parameters as indicated by symbol 465d.

The illustrated embodiment 400 assumes that for a given texel, T(x,y), whatever portion of its luminance is not constituted by reflected radiation, that remaining portion will be constituted by non-reflected or emitted radiation. In other words, for the respective material (M, 421) the 100%'s complement of $R_{SM}$ becomes the portion of the final luminance which the given texel emits as an exitance factor signal 452. Unit 451 performs the (1−x) function to define the (1−$R_{SM}$) signal 452. Multiplier 457 multiplies the shadowed emissance 488 with the exitance factor 452 to thereby define an emitted radiance signal 458b of the given texel, T(x,y) for the given material (M). Similarly, multiplier 456 multiplies the shadowed sky contribution 491 with the $R_{SM}$ factor 450 to define a diffuse and spectral refracted radiance signal 458a of the given texel, T(x,y) and given material, M. Summing unit 458 adds these two portions, 458a and 458b, of the material luminance signal to define output signal 459.

It is within the contemplation of the invention to use only one of reflection signal 458a and emission signal 458b for simulating the response of a given sensor instead of always combining both. Some types of FLIR sensors for example, are particularly sensitive to the emission signal part 458b and can be simulated with acceptable accuracy even if the reflection signal part 458a of their response is ignored. Similarly, some types of LLLTV's are particularly insensitive to the emission signal part 458b and can be simulated with acceptable accuracy even if the latter part 458b of their response behavior is ignored.

Until now, the discussion has pretended that the material defined by MID_a defines the full material content of the texel under consideration. However, the terrain texel can be complex and can have a mix of different materials. Multiplier 414 multiplies the luminance result signal 459 of the material identified by MID_a by the MIX_a signal 422 to define a luminance contribution 411 by material MID_a. The process discussed thus far for generating the material MID_a 411 is referenced as the material MID_a process 410. There are two or more substantially equivalent processes that run either concurrently or in series to define the respective material MID_b luminance signal 413 for the material identified by MID_b in data structure 420 and to define the material MID_c luminance signal 417 for the material identified by the MID_c entry in data structure 420, and so on if more MID's are used per-texel. These other material processes are respectively represented as 412 and 416 in FIG. 4 (there can be more or less). Summation unit 415 adds the contributions of the various material processes 410, 412, 416, etc. (only 3 shown) to define a composite per-texel luminance signal 419. This composite signal 419 may then be painted (recorded) into the frame buffer to define a corresponding luminance that is to be displayed for the given texel, T(x,y). As explained above, post-luminance processes may optionally change the level of displayed resolution to be other than on a per-texel basis, but such options are outside the present scope of discussion.

Note that the MIX_a signal 422 is further provided to summing unit 495 together with the other MIX signals of the Per-Texel Output Signal 420. Unit 496 performs the (1−x) function to define the one's remainder, which in the illustrated embodiment becomes the MIX_c signal. The so-produced, MIX_c signal is then supplied to material processing module 416. This scheme helps to reduce the number of bits needed in each PTOS structure 420. That, in turn helps to reduce the size and/or cost of texture memory 454.

Now that the luminance generator 400 has been described at a block level, we provide a brief review of the LUM GEN design to demonstrate that each texel address signal (x,y) of generator 467 can be converted into a composite, per-texel luminance signal 419 by passing each of the corresponding, material identifying (MID) signal 421, material mix signal 422, and texel normal signal (N) 423 through a set of high-speed lookup tables (LUT's) and/or multipliers and/or adders/subtractors. The direct signal flow paths of these signals 421, 422 and 423 are not encumbered by complex calculations. Nonetheless, the illustrated system accounts for the spectral response of the in-use sensor (144), for the spectral distributions and positionings of individual lighting sources, for the spectral reflection response of the various texel materials, for heating effects, for shadowing effects, and so on.

More specifically, a first serial flow-through path of the M signal 421 is defined through the temperature LUT 484, FIFO 487, black body LUT 486, multiplier 457, adder 458 and multiplier 414, and adder 415, for thereby forming the composite luminance signal 419.

A concurrent and parallel path for the M signal 421 runs through reflectance LUT 455, multiplier 456, adder 458 and multiplier 414, and adder 415, for thereby forming the composite luminance signal 419. A further concurrent and parallel path for the M signal 421 runs through reflectance LUT 455, fraction-complement forming unit 451, multiplier 457 adder 458 and multiplier 414, and adder 415, for thereby forming the composite luminance signal 419.

Mix signal 422 goes directly into multiplier 414, thereby forming a very fast feedthrough path into final adder 415. A concurrent and parallel path for mix signals MIX_a (422), MIX_b, etc., runs through adder 495 and fraction-complement forming unit 496, before entering in process module 416, the equivalent of multiplier 414.

The per-texel normal signal 423 (N) flows, in a first of serial paths, through the active, SM current sky map LUT 464, multiplexer 466, multiplier 461, summing unit 462 and multiplier 456 to thereby define the diffuse and spectral refracted radiance signal that enters adder 458. A parallel and second path of the N signal 423 flows through the active, solar loading LUT 474, multiplexer 476, multiplier 481, temperature LUT 484, FIFO 487, black body LUT 486, and multiplier 457 to thereby form the emitted radiance signal that enters adder 458.

Shadowing effects are quickly provided for on a per-texel basis as seen by the flow of the CSN and OSN signals from respective multiplexers 434 and 435. Note that the OSN signal is time-delayed and thereby defines a shadowing of the black body emissance at an earlier point in time than simulated real-time.

Software implementation for defining the luminance amount for each material can be boiled down to the following three equation lines of C-like code wherein each line ends with a semicolon (;), wherein an asterisk (★) indicates multiplication, and wherein a dot (.) indicates an array lookup parameter:

SOLAR_LOAD=Solar_Load_LUT[texel.normal.phi, texel.normal.theta]★Delayed_Time_MUX[texel.shadow];

REFLECTANCE=Reflectance_LUT[texel.material];

LUMINANCE=REFLECTANCE★(SOLAR_LOAD★Time_MUX[texel.shadow]+Ambient)+(1-REFLECTANCE)★Black Body_LUT[Temperature_LUT[SOLAR_LOAD], texel.material];

Of course, as explained above, any one or more parts of this software implementation can be replaced by a hardware implementation in accordance with desired speed and cost trade off. The software code may be loaded into an appropriate computer for execution of the code, where the loading step may be carried out by conveying the code on a computer-readable medium such as floppy disk or magnetic tape. The same or a further medium may be used to convey the data for the per-texel texture map and data concerning spectral characteristics of sensors and materials as will become apparent shortly. Alternatively or supplementally, the software code may be loaded into an appropriate computer for execution of the code, where the loading step is carried out partly or wholly by conveying the code as manufactured instructing signals that are broadcast or unicast to the instructions obeying computer by way of a network or by wireless transmission or by other appropriate, signal conveying media.

Figure 5A:
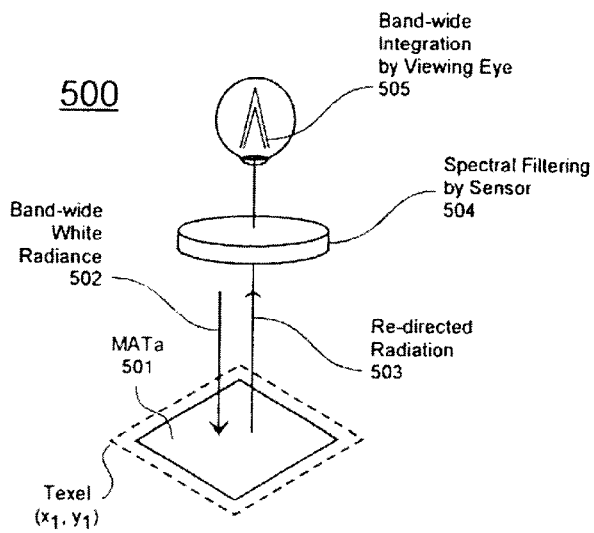
FIGS. 5A–5B explain how the addressable contents of the sensor-modulated, reflectance LUT can be developed.
Figure 5B:
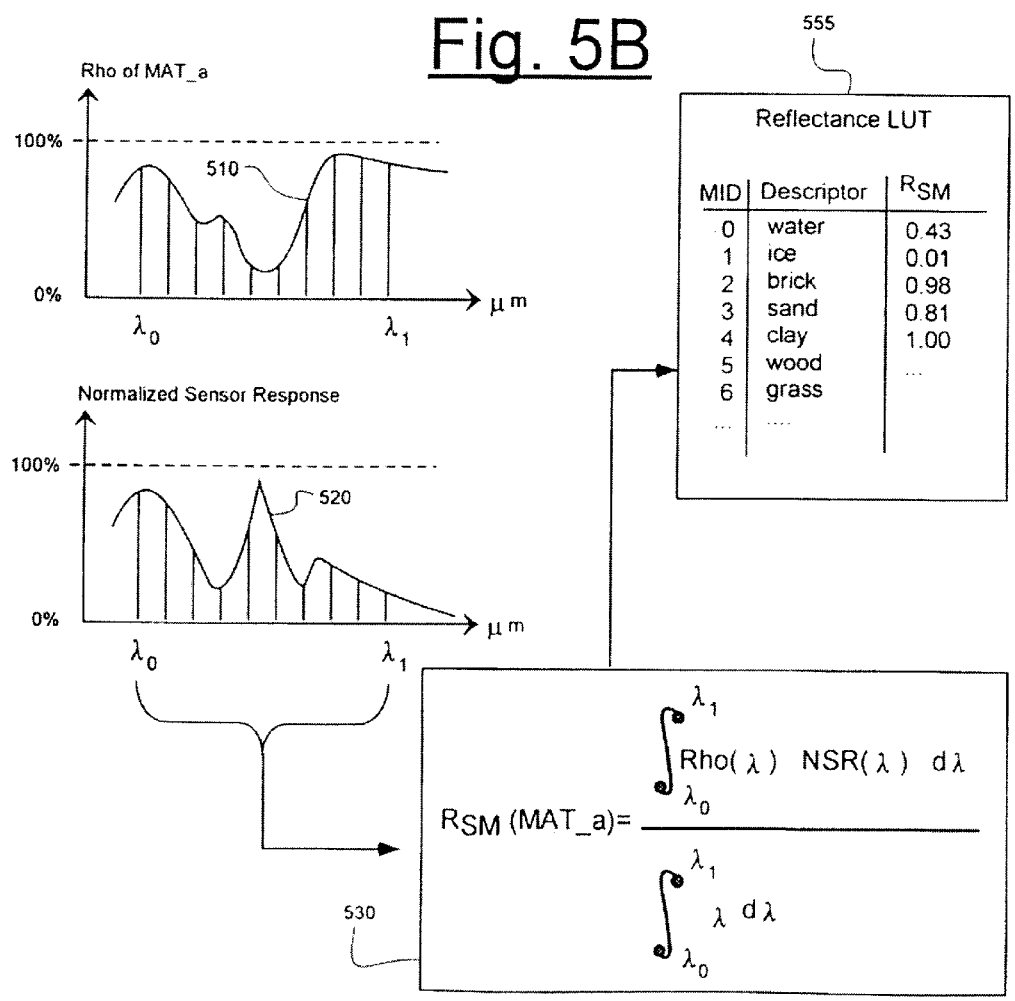

Referring to FIGS. 5A and 5B, an explanation will now be provided for how the reflectance LUT 455 (FIG. 4) may be configured in accordance with the invention. The material MAT_a surface portion 501 of addressed terrain texel, $T(x_1,y_1)$ is assumed to be struck by band-wide, white light (radiation) 502. Note that we are not yet accounting for the spectral densities of the lighting sources available in the simulated, mission arena. Depending on what specific material defines surface portion 501 of the terrain texel, a certain amount of the incident radiation 502 will be reflected or refracted towards the direction of the in-use sensor (144) to thereby define re-directed beam 503.

The surface re-directed beam 503 is then spectrally filtered by the in-use sensor as indicated by schematic symbol 504. The intensities of all the passed wavelengths are integrated as indicated by schematic symbol 505 to define a final, single value that defines the proportion of incident light 502 that will be seen as reflected and sensor-modulated light at the end of the detection process. This single value is referred to herein as $R_{SM}$ or the sensor-modulated Rho of the given texel $T(x_1,y_1)$, assuming it is made of a single surface material 501.

FIG. 5B shows how these concepts are combined to define contents of a reflectance LUT 555. An exemplary plot of reflection percentage (Rho) versus wavelength for a given material (MAT_a) is shown at 510, where the plot covers a relevant wavelength range, $\lambda_0$ to $\lambda_1$ of the in-use sensor. An exemplary plot of a relative or normalized sensitivity per wavelength versus wavelength is shown at 510 for the in-use sensor, where again the plot covers a relevant wavelength range, $\lambda_0$ to $\lambda_1$. Computation module 530 multiplies on a per wavelength basis, the material Rho of plot 510 against the normalized sensor response (NSR) of plot 520 and integrates the results over the relevant wavelength range, $\lambda_0$ to $\lambda_1$. This result is normalized for all wavelength ranges with a dividing factor such as that shown in the denominator portion of the equation shown in box 530. The material-dependant result is then stored in a respective MID slot of reflectance LUT 555 and the computation process 530 is carried out for a next material until all the MID-addressable slots of LUT 555 are filled. In one embodiment, computation process 530 is carried out with 32 bit internal precision even though the final $R_{SM}(MAT\_a)$ results are 10 bits wide each. As seen in the example within box 555, $R_{SM}(MAT\_a)$ results can be as small as about 0.01 and can be as large as about 0.80.

Referring still to FIGS. 5A and 5B, there is a complementary mechanism that can be accounted for with essentially the same algorithm. For each given material 501, there may be a portion of incident radiation 502 that is absorbed rather than reflected. This amount of absorption may be defined as 1-Rho, or in other words, by the white region between the top of plot 510 and the 100% line. The portion, 1-Rho of incident radiation 502 that is absorbed by the texel material is converted into heat. Later that heat may cause black body radiation to be emitted from the absorbing texel. Of the spectral distribution of black body radiation that is emitted by the given texel, $T(x_1,y_1)$, a certain part will be blocked out by the spectral blocking properties of the in-use sensor. The spectral blocking properties of the in-use sensor may be defined as 1-NSR, or in other words, by the white region between the top of plot 520 and the 100% line. A normalized integration of the two per-wavelength multiplying factors, 1-Rho and 1-NSR may be defined simply as $1-R_{SM}(MAT\_a)$.

Figure 6A:
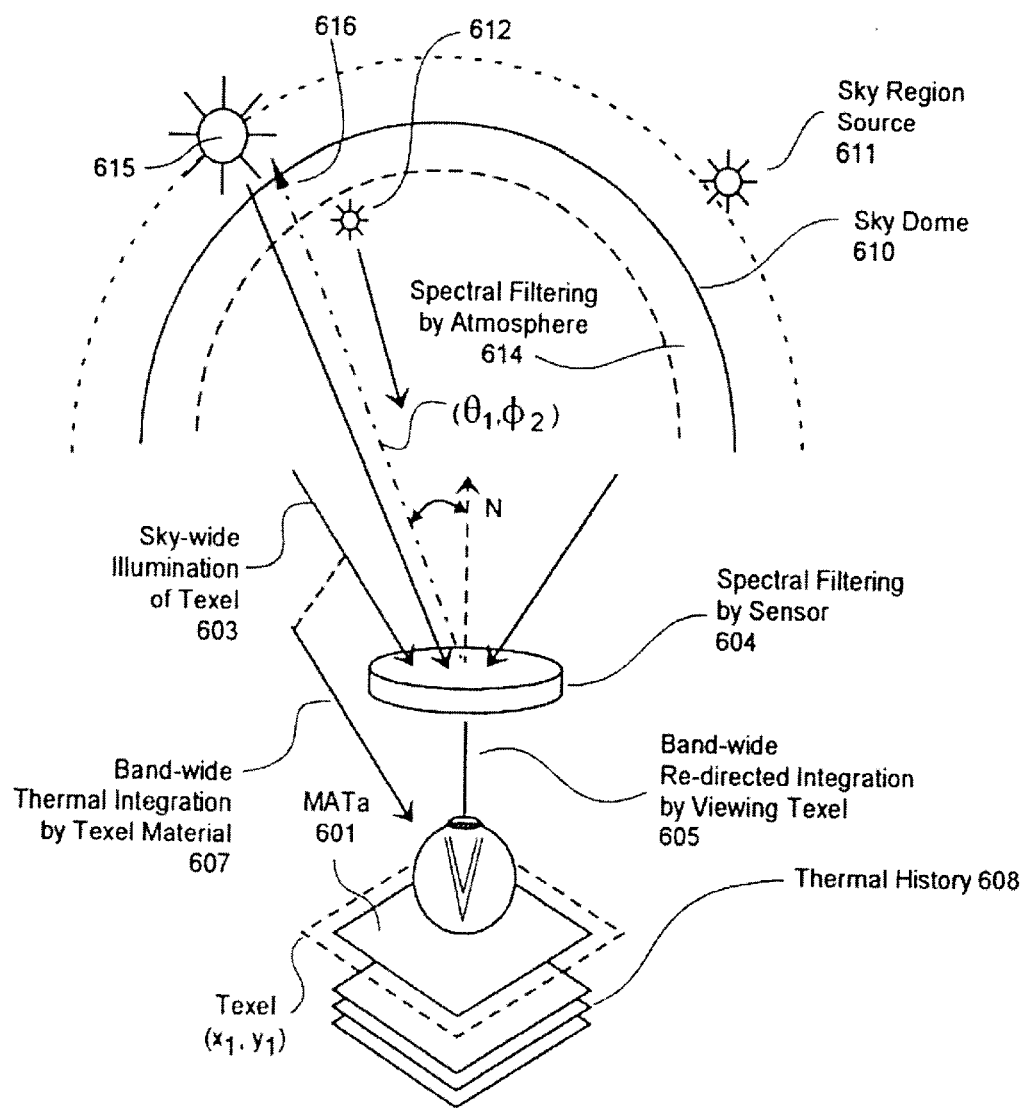
FIGS. 6A–6B explain how the addressable contents of the sensor-modulated, sky-map LUT can be developed.
Figure 6B:
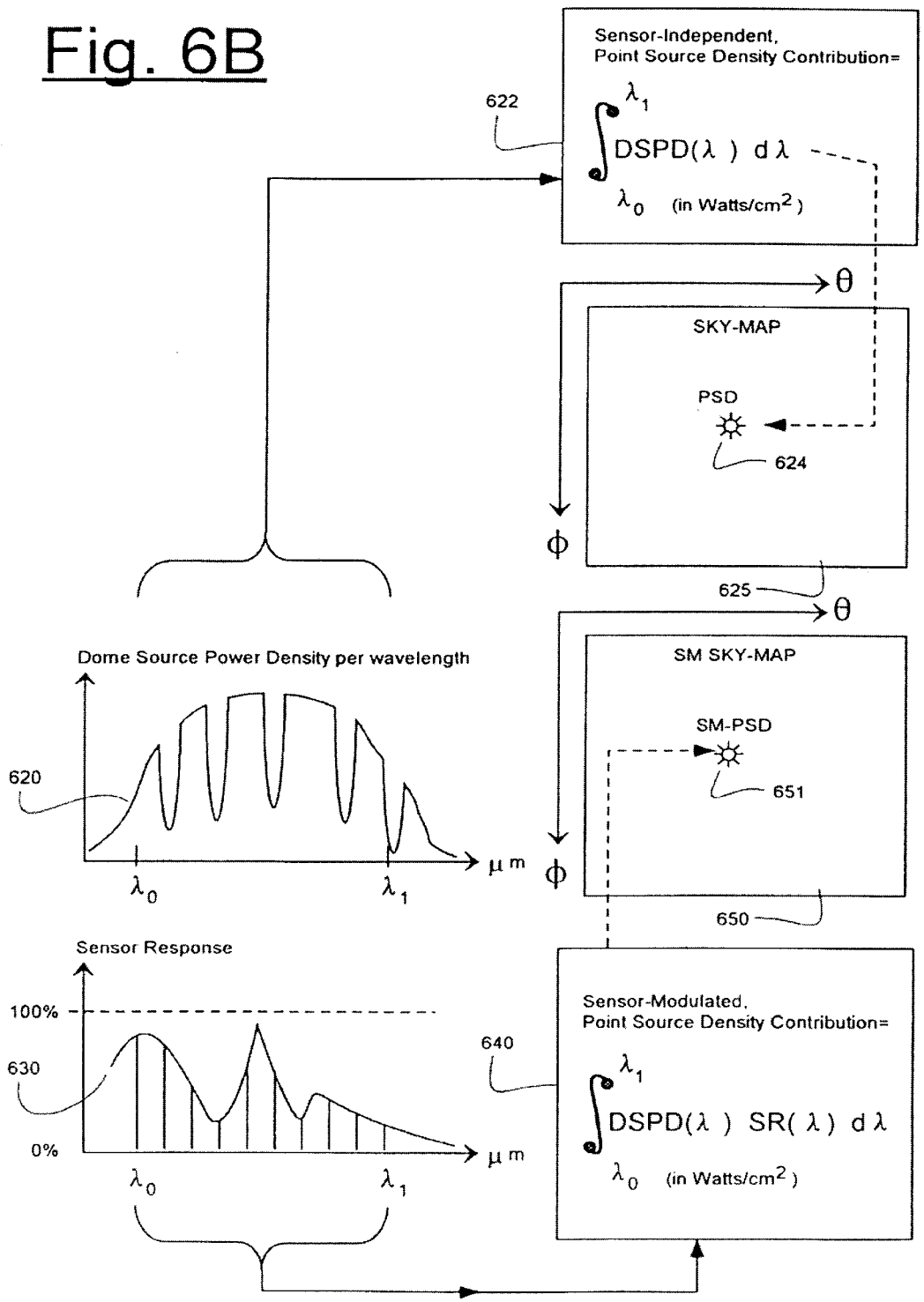

Referring to FIGS. 6A and 6B, an explanation will now be provided for how the sensor-independent, current sky map 440, the SM current sky-map LUT's 464, and the solar-loading LUT's 474 (FIG. 4) may be configured in accordance with the invention. The material MAT_a surface portion 601 of addressed terrain texel, $T(x_1,y_1)$ is assumed to be facing straight up (N=0,0 degrees) while the surrounding-sky rotates relative to it. Unlike the case of FIGS. 5A–5B, this time we will be accounting for the spectral densities and positionings of the lighting sources available in the simulated, mission arena 600.

Sky dome 610 extends across a relevant range of spherical angles such as $\theta=-90°$ to $+90°$ and $\phi=-90°$ to $+90°$. Radiation point sources of different intensities and spectra, such as sources 611, 612, 615 are distributed about the mission arena 600, typically across the sky dome 610. For example, 615 might represent the sun while 611 represents the moon and 612 represents a flare that temporarily ignites, low in the sky. Atmosphere 614 provides a first, spectral filtering function for some, but not necessarily all of these sources (e.g., not for flare 612). The combined effects of each given radiation point source (e.g., sun 615) and its corresponding atmospheric filtering 614, if any, is plotted such as for example by the illustrated Dome-Source Power-Density per wavelength plot 620 (DSPD($\lambda$)) of FIG. 6B. Typically this DSPD plot 620 will have a Gaussian-like general outline with thin spectral counter-bands being excised out by atmospheric absorption bands, as is illustrated. The DSPD plot 620 should cover the relevant wavelength range, $\lambda_0$ to $\lambda_1$ of the in-use sensor.

For each position pointed to in the sky map, additive superposition of the DSPD plots (620) of all point sources (611 +612 +615 +. . . ) that are present at that sky-map position (say, $\{\theta_1,\phi_1\}$ which is pointed to by vector 616) defines the total illumination contribution by that sky-map position $\{\theta_1,\phi_1\}$ to all texel's whose normals point to that sky-map position. Thus, if the illustrated sky-dome 610 rotates until vector 616 (which vector points to sky-map position $\{\theta_1,\phi_1\}$) aligns with the normal N of the illustrated texel, $T(x_1,y_1)$, then the peripheral DSPD plots of sun 615 and flare 612 will define the primary lighting for that texel, $T(x_1,y_1)$ at that time. Integration across $\lambda$ of these added DSPD plots, taken over the relevant wavelength range, $\lambda_0$ to $\lambda_1$, generates a single point source density (PSD) value for that and each further one of the angularly addressable points in the sky-dome. (It will be seen later that one does not have to perform the integration for all points of the sky-dome but merely for exemplary, center points of each radiation-emitting object of the sky-dome. See FIG. 6C.) This kind of simplified integration is shown to be carried out in FIG. 6B by software module 622 for producing a corresponding, Point Source Density value (PSD) that is to be associated with position 624 in sky-map 625.

If the sky-dome is being looked at through the eyes of the in-use sensor (144), the spectral filtering effects 604 (FIG. 6A) of the sensor should be accounted for. This is done in FIG. 6B by multiplying on a per wavelength basis, each DSPD value of plot 620 against the normalized sensor response (NSR) of plot 630 of the in-use sensor and integrating the results over the relevant wavelength range, $\lambda_0$ to $\lambda_1$ as is indicated in computational box 640. This integration result is given in terms of power per unit area, such as in terms of Watts per $cm^2$. The corresponding, sensor-modulated result (SM-PSD) may then be stored in a corresponding, angularly addressable storage location (e.g., 651) of an SM Sky-map LUT 650.

Assume next, that the sky-dome is not being looked at through the eyes of the in-use sensor, but rather from the vantage point of a material surface that might be heated by radiation sources in the sky. In such a case, the spectral filtering effects 604 of the sensor should be bypassed as is indicated by illumination line 607. The contributions of each DSPD value of plot 620 should be accounted for by integrating over the relevant wavelength range, $\lambda_0$ to $\lambda_1$ as is indicated in computational box 622. Such sensor-independent contributions are provided by the corresponding, sensor-independent PSD values that are stored in the corresponding and angularly addressable storage location s (e.g., 624) of the sensor-independent sky-map 625. The latter map 625 corresponds to memory 440 of FIG. 4.

For thermal effects, however, the current, sensor-independent sky-map 625 (440) is not enough. Radiation that is pumped in over time defines the energy input history 608 of the given material at the addressed texel, $T(x_1,Y_1)$. That is why the solar-loading LUT's 474a, 474b, etc., are provided in FIG. 4 to keep track of the more-recent history of the current sky map 440. Also, the temperature of a given material is a function of the material and its absorption characteristics. That is why the temperature LUT 484 is provided and why exitance factor 452 is generated in luminance generator 400.

Figure 6C:
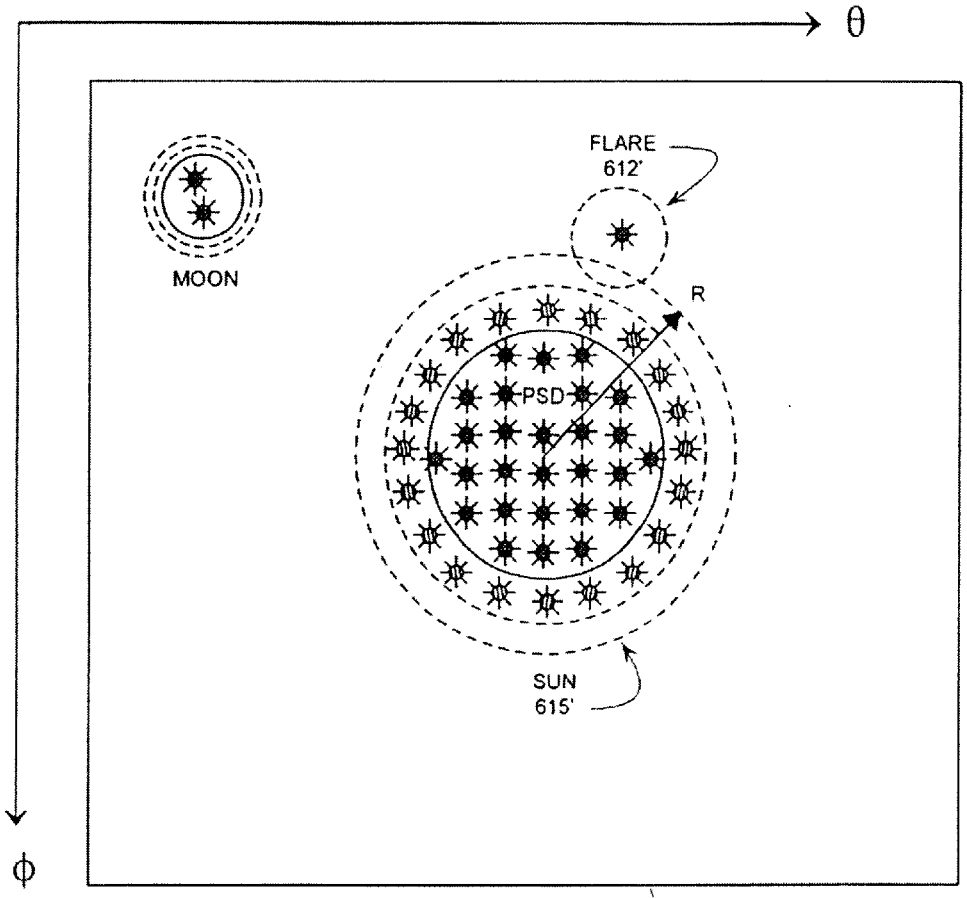
FIG. 6C shows a possible mapping of lighting source intensities onto the $\theta$ versus $\phi$ plane of the sensor-modulated, sky-map LUT.

Referring to FIG. 6C, an example of what a current sky map 625'/650' might look like is shown. This example 625'/650' may be taken to be representative of either the sensor-independent, current sky map 625 or the sensor-modulated (SM) current sky-map 650. Sun 615' is defined as a set of concentric -and circular ring regions, where each such region has a respective PSD or SM-PSD value assigned to its ($\theta,\phi$) coordinates. The relationship between the respective PSD values can be defined as peaking at the center of the object and then decaying as one moves along a radius R, outwardly from the center. In one embodiment, for example, the innermost ring of the sun 615' is defined to have a first radius, $R_1$ of about 3.5°. The moon, in comparison is assigned an inner first radius of about 1.5°. The inner and peak PSD and peak SM-PSD values at the center of each object are computed using, for example, the algorithms 622, 640 shown in FIG. 6B. The sky-map memory locations corresponding to the ($\theta,\phi$) coordinates of the innermost ring of each object are filled with the respective peak values for that illuminating object. Then a decaying function such as a cosine function is applied to define PSD values for outer-more rings. For example, $PSD_{Ring2}=PSD_{Ring1} \star \cos(R_2-R_1)$. This is just an example, other decaying functions may be used such as Lambertian functions or Gaussian functions, as is appropriate for each object and the realism demanded by a given application. It is important to note that the sky-maps can be filled in off-line relative to the streaming-through time of the Per-Texel Output Signals 420. Accordingly, the time and complexity for performing the sky-map filling operations do not directly interfere with the pass-through rate of the PTOS data 420.

What if two or more objects overlap in the sky map, such as is the case for the illustrated sun 615' and flare 612'? Then the contributions of each may be simply added together in the region of overlap. This action is better seen in the 3-dimensional perspective of FIG. 6D, wherein PSD values of individual objects are depicted as heights distributed across sky-map plane 660. The 3-dimensional Gaussian shape 665 represents the PSD contributions of sun 615' while the inverted, cone-like shape 662 represents the PSD contributions of flare 612'. Where they overlap, the final sky-map PSD value can be simply the sum of the PSD contributions from respective shapes 665 and 662. Superposition functions other than simple addition may be used alternatively if desired. Speed of computation is not a major problem here because it can occur outside the serial flow-path of the per-texel information.

Figure 6D:
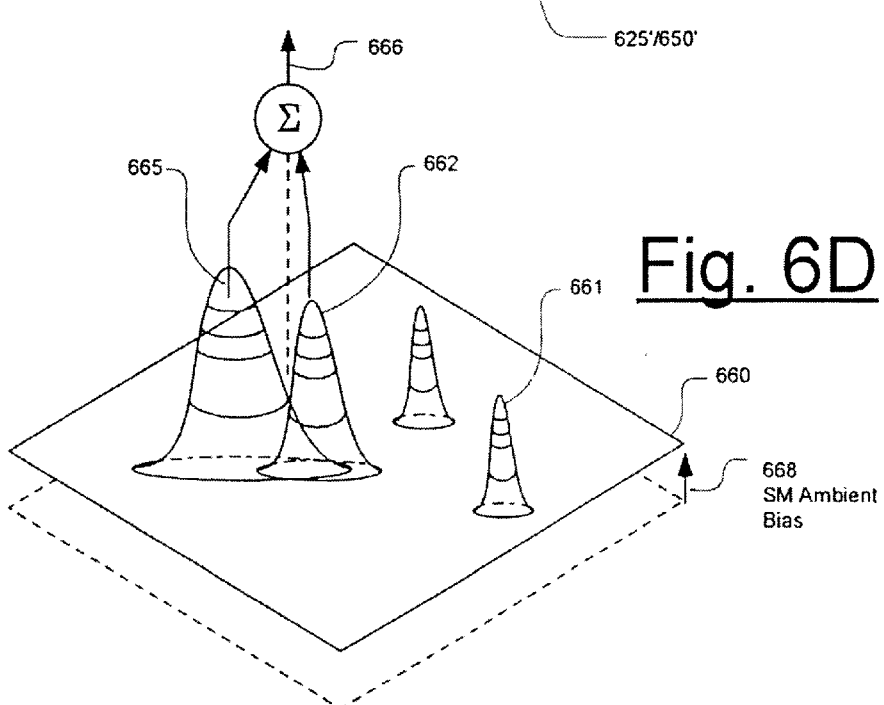
FIG. 6D is a perspective view of a three dimensional representation of a sensor-modulated, sky-map with SM ambient bias added.

The 3-dimensional, inverted, cone-like shape 661 in FIG. 6D represents the PSD contributions of yet another source in the sky. Some sources may be seen in the sensor-independent, current sky map 625 but not in the sensor-modulated (SM) current sky-map 650 because the spectral characteristics of the in-use sensor block out the emissions of those objects.

FIG. 6D also demonstrates how ambient memory 468 can function to simultaneously increase or decrease the effective PSD values of current sky-map LUT 464 by adding a bias to the floor level 660.

Figure 7:
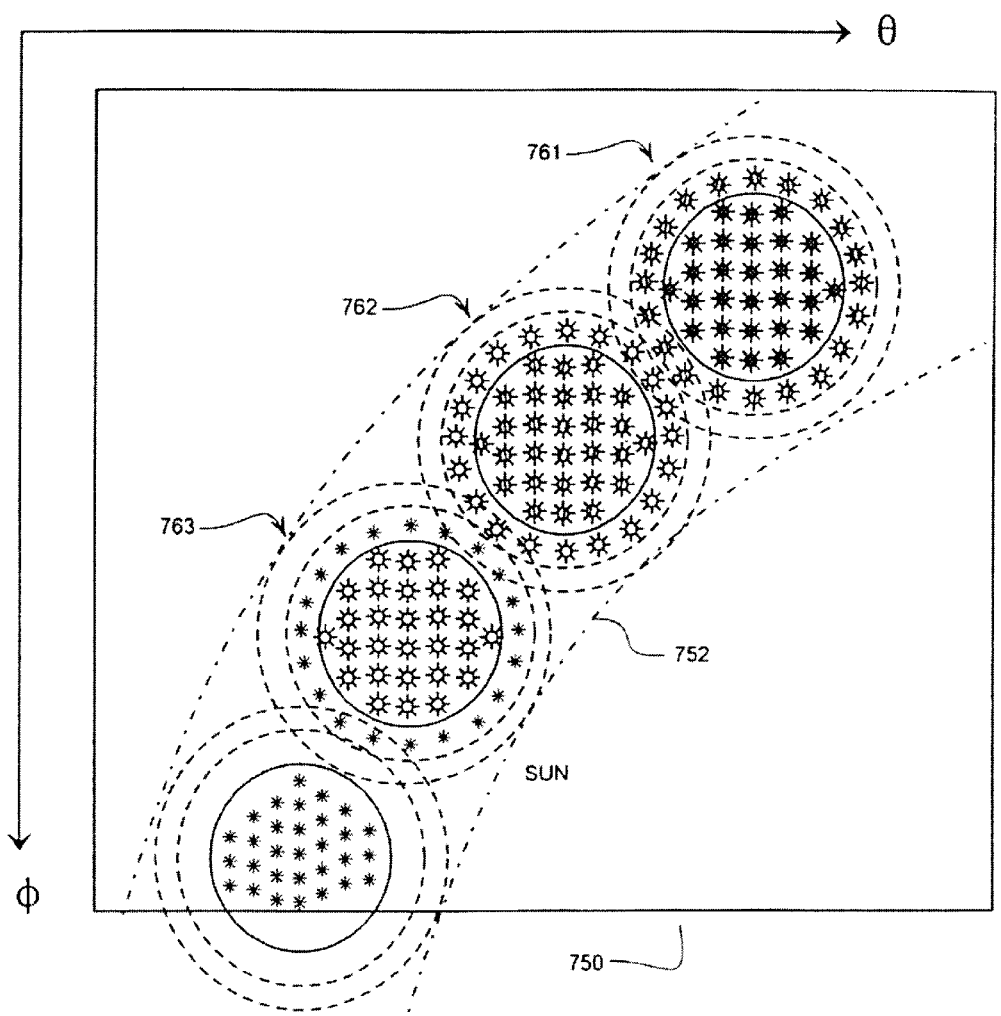
FIG. 7 shows a possible mapping of thermal loading, source intensities onto the $\theta$ versus $\phi$ plane of the sensor-independent, thermal loading LUT.

FIG. 7 provides an example of what a historic sky map 750 might look like. Here, the sun is seen to be cutting an arcuate path 752 across the sky. Concentric rings pattern 761 represents the most recent snapshot of the sun while pattern 762 represents the next most recent, but somewhat-faded snapshot; pattern 763 represents an earlier and even more-faded snapshot; and so forth. The dark filled stars at the center of most recent pattern 761 represent relatively large PSD values. The hatch-filled stars at the center of the second most recent pattern 762 and in ring 2 of pattern 761 represent relatively smaller PSD values. The hollow stars at the center of the third most recent pattern 763 and in ring 2 of pattern 762 represent relatively even smaller PSD values, and so forth. When filled-in and summed, the patterns may appear to define a comet streaking across the sky and leaving a fading tail behind it. In a given mission arena where the sun has just set, objects that were just heated by radiance from the sun may exhibit black body radiance that comports with such a fading, historical comet.

Figure 8:
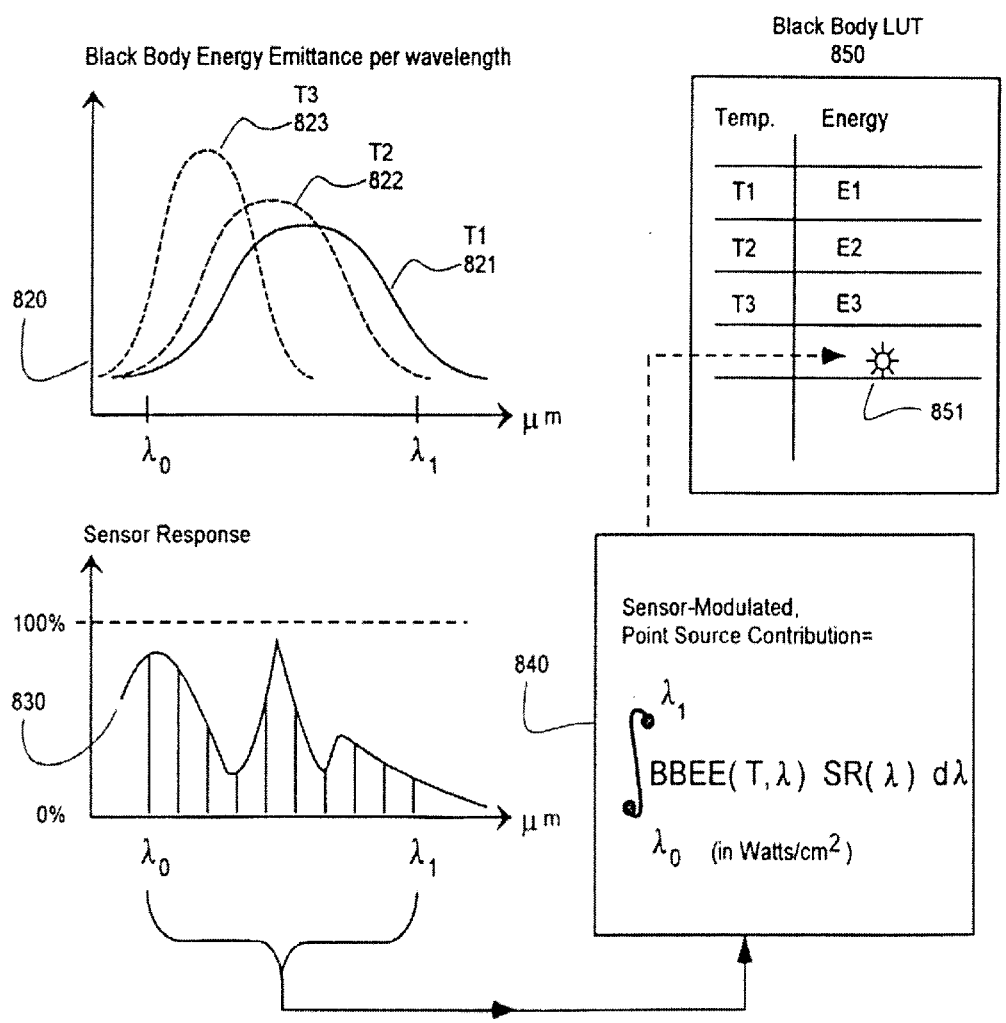
FIG. 8 explains how the addressable contents of the black body LUT can be developed.

FIG. 8 demonstrates how a black body LUT may be programmed. A well-known Planck's equation defines the spectrum of black body emission for each given temperature of any object, irrespective of its material make up. This set of relationships is represented at 820 and shows that a first plot 821 of wavelength versus emitted energy is associated with a first temperature, T1. If temperature increases to a higher second temperature, T2, the emissions become more energetic and shift to shorter wavelengths as indicated by plot 822. Third plot 823 shows a further shift for yet higher temperature, T3.

If a black body object is being looked at through the eyes of the in-use sensor (144), the spectral filtering effects of the sensor should be accounted for. This is done in FIG. 8 by multiplying on a per wavelength basis, each Black Body Energy Emission (BBEE) value of appropriate plot 821, 822, 823, etc., against the sensor response (SR) of plot 830 of the in-use sensor and integrating the results over the relevant wavelength range, $\lambda_0$ to $\lambda_1$ as is indicated in computational box 840. This integration result is given in terms of power per unit area, such as in terms of Watts per $cm^2$. The corresponding, sensor-modulated result (SM-Emit) may then be stored in a corresponding, temperature addressable, storage location (e.g., 851) of a Black Body LUT 850. LUT 486 of FIG. 4 may be configured accordingly. The process of FIG. 8 is repeated for filling black body results for each of the $2^N$ temperatures specifiable by the temperature LUT 484 ($2^N=256$ for the case of N=8).

Contents of the temperature LUT 484 can be determined empirically by measuring and/or interpolating for the temperature of each of the MID-specifiable materials after exposing each such material to thermal loading corresponding to various values of the thermal loading signal 470 and ambient temperature and/or wind speed conditions corresponding to those specifiable by unit 489.

The LUT-based luminance generator 400 that has been described thus far has numerous advantages beyond just that of allowing polygons to be quickly filled in with appropriate texture data (per-texel data or derivations made therefrom). The LUT-based luminance generator 400 is able to realistically account for: (a) the materials mix of each terrain texel, (b) the surface slope of each terrain texel, (c) the mission arena sky map that currently illuminates each texel of the observable terrain, and (d) the thermal loading history that defines the black body emissance of each texel of the observable terrain. The described generator 400 can also account for shadows that appear and disappear over different times of the day. It can further account for changes in diffuse lighting conditions, ambient air temperature and wind speed. More importantly, sensor parameters can be easily changed so that the real-time journey simulation can show what a specified terrain will look like when viewed through mission-specific sensors. Also, the generator 400 enables the display on a 1-for-1 correspondence basis between texels of the Out-of-Window Perception Of Terrain (OwPOT) and texels of the Sensor-assisted Perception of Terrain (SaPOT). The human eyes can be treated as just another form of sensor. What this means is that inter-vertex features such as the small-width feature 115' of FIG. 2C will not generally disappear from the simulated SaPOT display while still remaining visible in the simulated OwPOT display. If the latter were allowed to happen, pilots would become confused as to why a small stream (for example) is visible in the OwPOT display and not in the SaPOT display.

FIG. 9 provides an illustrative example of this 1for-1 correspondence feature. Similar to the case of FIG. 2C, there is shown in the now illustrated situation 980, a small-width feature 915' such as a stream of water that snakes through between a set of projected vertices (e.g., V2", V4", V5"). Because it snakes in between the polygon vertices, the material characteristics of the snaking-between stream 915' cannot be captured by the in-use geometry engine as the latter projects corresponding vertices V2', V4', V5' onto viewing plane 965'. Another small-sized feature 916', for example a tank, is added to the simulated scene 965' for purpose of drama. Unlike the stream 915' along which it moves, the tank 916' is not a permanent part of the terrain and thus would not be included in the terrain map. It can be projected into the scene by overlaying its imagery on top of the texture map imagery of the more-permanent terrain. The texel-level resolution for the tank image 916' should be the same as the per-texel resolution for the surrounding, more permanent terrain features (e.g., stream 915').

Pilot 935 views the simulated scene 965' by way of image display subsystem 940. Display subsystem 940 can be constituted by one or more video monitors that surround the pilot 935 to mimic a cockpit that has a front cockpit window 930 and perhaps side-view windows (not shown). The display subsystem 940 is driven by one or more simulation computers 950. These computers 950 include LUT-based, SaPOT simulating means such as described herein. The LUT-based, SaPOT simulating means within computer(s) 950 may be implemented partially or fully with any practical combination of hardwired hardware, programmable hardware and/or installable software. In one embodiment, computer(s) 950 are initially provided as one or more general-purpose, and/or image-rendering, computers and are re-configured or programmed with appropriate software to perform the herein-described functions. The re-configuring or programming of the computer(s) may be carried with use of one or both of computer-readable media (e.g., a CD-ROM or floppy diskette) 951 and network-downloaded signals 952, where the media 951 and/or signals 952 provide instructions for causing the computer(s) to become configured or programmed to include LUT-based, SaPOT simulating means described herein and/or to carry out the terrain simulating methods and/or LUT-creation methods described herein.

Navigation joystick 953 may be used to simulate flying through the simulated mission arena 965'. The pilot's helmet may include a flip-down image display means 954 that simulates a set of flip-down, night vision goggles (NVG's). These are indicated to be further driven by computer(s) 950 using cable 956 or equivalent means (e.g., an optical link). Turning of the pilot's head is detected by the simulation-driving computer(s) 950 so that a corresponding image is shown in the flip-down image display means 954.

The computer-simulated environment 955 can include simulation of an Out-of-Window (OW) view 936 and concurrent simulation of a heads-up projection of a FLIR sensor image 937 onto the simulated cockpit window 930. Ideally, the OW view 936 should exactly coincide with the heads-up sensor projection 937 so that the pilot 935 will be able to easily correlate in his/her mind features that are viewable only with the eyes against features that are made visible by the heads-up sensor projection 937. For example, the simulated FLIR projection 937 may be able to distinguish a signature black body emission of the engine manifold of the simulated tank 916'. For such exact coincidence of the OW view 936 and the heads-up sensor projection 937 to occur, the simulation driving computer(s) 950 should be able to provide per-texel unification 938 of the simulated OW view 936 and of the simulated sensor view 937. This is easily done with the through-sensor, per-texel imaging of terrain as described above. The texture-overlaid tank image 916' can be made to blend seamlessly into the per-texel imaging of the terrain. (The blending of the OwPOT image 936 with the SaPOT image 937 can be had by way of alpha blending, simple addition, or other appropriate techniques.) Moreover, a same, base terrain-map database can be used for simulating mission arenas with all different varieties of texture-overlaid features and all different varieties of sensors as may be desired. Accordingly, a seamless and low-cost method has been disclosed here for combining a base terrain-map database (e.g., V2", V4", V6") with mission-specific, texture-overlays and mission-specific, combinations of sensors (e.g., 954, 937). Note that per-texel unification 938 can also occur between the simulated OW view 936 and the imagery of the flip-down, simulated goggles 954. Thus, differently sensed versions of the simulated imagery scene that surrounds the pilot 935 can be seamlessly unified on a per-texel basis to thereby provide a simulation with good realism.

FIG. 10 illustrates another aspect of the invention. Sensor-specific information and/or mission-specific information can be secured and supplied separately from sensor-independent and mission-independent information. The maintenance of the secrecy of certain mission-specific information and/or sensor-specific information can be vital to certain kinds of missions such as military or law-enforcement missions.

A system administrator may not wish to allow non-authorized personnel to have access to information such as the planned time of the mission, the planned flight path, the planned sky map and the planned set of sensors that are to be deployed. At the same time, it may be more cost-effective to allow non-authorized personnel to service or supply various parts of the overall mission-simulating system instead of having to secure everything within the system. The LUT-based architecture of the present invention allows for such cost-effective servicing while allowing for selective secreting away of sensitive information.

More specifically, in FIG. 10, a first portion 1010 of overall system 1000 can remain relatively unsecured and accessible to non-authorized personnel for routine maintenance service when not in use. This unsecured first portion 1010 can be connected to access one or more, unsecured vector-based and/or texture-based, terrain database servers 1012 that provide terrain information of a general nature. Such database servers (computers and/or disk farms) 1012 can be purchased or leased from any of a plurality of trustworthy vendors on a cost-effective basis and can be updated as appropriate (e.g., when new buildings are erected in a target area) without revealing mission specifics. As seen, this non-secured database information 1011 is accessed by the geometry engine portion 3511 of graphics pipe 350'. The correspondence between elements of FIG. 3 that are numbered in the '300' century series and those of FIG. 10 that are similarly numbered should be apparent. A repeated description of these is therefor not needed. Of course, information about what specific parts of the terrain database(s) 1012 are accessed and in what sequence during simulation of a mission should be safeguarded since that can reveal the planned flight path. On the other hand, mere provision of large terrain databases that cover many large geographic areas does not jeopardize the security of specifically-planned missions.

A second portion 1020 of the overall mission simulation system 1000 can be constituted of progressively more and more secured parts and/or information. For example, the information that is sequenced through the current sky map memory 440 (FIG. 4) might reveal the time of day or night for which the mission is planned by showing concurrent locations of the sun, moon and even perhaps the stars. Such nature-based information may also reveal the geographic location of the mission (e.g., latitude and/or longitude) and its planned timing. Such information may further reveal what kinds of artificial lighting sources (e.g., flares), if any, are planned and may give away the nature of the sensors that are to be deployed.

However, general sky map information 1040a and mission-specific sky map information 1040b can be kept separate from one another. For example, generic sky map information 1040a that is based on natural lighting sources (e.g., sun, moon and stars) may be acquired from a first database into which authorized users input the following relevant information: (a) day of the year; (b) time of day and (c) geographic location of the mission (e.g., latitude and/or longitude). The generic sky map information 1040a may then be combined 1041 just when needed with mission specific, sky map information (e.g., current weather conditions and artificial lighting sources) to thereby provide a composite sky map for loading over a secured link 1043 into current sky memory 440'. Then, after the mission simulation completes, the composite sky map data in sky memory 440' is erased as indicated by control connection 1045 to thereby maintain security over that information. Similarly, composite sky map data that is derived from sky memory 440' and stored into other sky LUT's such as 474' should also be erased at the end of each simulated mission. As seen in FIG. 10, multiple and separate sky map servers 1040 may be used to separately provide different parts of the composite sky map for improved security. Server 1040b may for example, provide only the path and spectral emission characteristics of a certain flare while server 1040a provides more general information about the sky paths and spectral contributions of common and natural sources such as the sun, moon and stars. The information signals provided by sky map servers 1040 are independent of data concerning the characteristics of the sensors that are to be deployed during a given mission. Accordingly, even if vendors of the sky-map data inadvertently experience a breach of security, that breach does not give away sensitive information about the specific sensors that will be deployed.

In similar vein, data 1065 on specific sensor parameters may be supplied by separate and secured servers 357' for loading into sensor-modulated LUT's such as 464' and 456'. This data should be erased 1066 at the end of each simulated mission. The vendor (supplier) of the sensor parameters and/or sensor parameters servers 357' does need access to the sky map data and vice versa. Each such kind of data can be supplied independently and securely by a separate party. As such, the types of sensors to be used in each simulation of a mission can be easily changed. Different sensors can be tested until an optimal configuration is found for dealing with terrain-specific and/or arena-specific problems.

In similar vein to the above, data 1022 on specific textured artifacts (e.g., tank 916' of FIG. 9, or snow added to the materials mix of the terrain) may be supplied by separate and secured servers 354' for loading into the terrain map memory (454 in FIG. 4). Different weather conditions can be accounted for by texturing into the mix of surface materials, various quantities of snow or rain or other surface coating materials.

Data integration means 1025 of FIG. 10 represents a combining of all the different kinds of LUT's and data signals in accordance with FIG. 4 to thereby define a luminance generator 4001 that receives from raster engine 352', a stream of coordinate signals x,y representing points within a projected polygon, and that responsively produces a stream of luminance signals (LUM) for use in painting respective pixel locations of frame buffer 353' or its equivalent.

Note that even if the outputs of specific LUT's are intercepted by unauthorized persons (such as the output stream 460 of one or more of the sky-LUT's 464a, 464b; or the output stream 450 of the reflectance-LUT 455; these are mathematically integrated signals which by nature hide specific information about the sensors, sky-maps and terrain material mixes that were used to integrally formulate such output signals 460 and 450. As such, inherent security is provided for the specific information about the sensors, sky-maps and terrain material mixes that are to appear in a given mission.

For one embodiment, a secured, sensor-host computer is provided as a metal-encased, first black box which integrally fits into a lockable slot in a general rack of image-generating computers (imaging-hosts) such that signals from the black box cannot be tapped into from outside the rack while the black box is physically locked into place in the rack. For example all I/O connectors of the black box may be positioned only on the back end of the box such that these cannot be accessed while the black box is locked into position in the rack. The first black box (the sensor-host computer) implements at least all the sensor-dependent LUT's such as 464a, 464b, 486 and 455 of FIG. 4. It also implements at least the sky-map specific LUT's such as 474a, 474b of FIG. 4.

In the same one embodiment, a secured, flight-host computer is provided as a metal-encased, second black box which also integrally fits into a general rack of image-generating computers (imaging-hosts) such that signals from the second black box cannot be tapped into from outside the rack while the black box is physically locked into place in the rack. For example the I/O connectors of the second black box are also only on the back end of the box and these cannot be accessed while the black box is locked into position in the rack. The second black box (flight-host computer) converts joystick 953 or like pilot inputs into flight signals that define mission specific details such as exact geographic location (longitude & latitude) and how the vehicle is to respond to pilot inputs (953). The latter may identify what kind of airplane or other vehicle is being used for the mission.

Authorized persons who control the two black boxes, and the remainder of the rack-based system during its use, may guard further specifics about the mission by supplying the time of year, time of day, general geographic location (longitude & latitude) information about the mission to the generic computers in the rack only at the time the simulation runs and by causing the information to be erased after simulation completes. In this way, specifics about sensor response, location of the mission, time of the mission, use of artificial light sources, what types of airplanes or other craft are being used, and so forth can be well guarded while at the same time, generic database providers can provide generic, non-sensitive information such as publically known terrain details and natural sky maps. This provides for a secure but cost-effective way of simulating real-time mission runs over real-world terrains that are illuminated by real-world, natural sky-maps while using secreted vehicles, secreted sensors, and secreted artificial lighting sources as desired.

The above disclosure is to be taken as illustrative of the invention, not as limiting its scope or spirit. Numerous modifications and variations will become apparent to those skilled in the art after studying the above disclosure.

By way of one example, the transfer functions of LUT's 484 and 486 of FIG. 4 can be combined to define a single LUT that receives signals 421 and 470 and responsively outputs signal 488. In a countervailing second example, the transfer functions of devices that are shown herein as single LUT's can be split across a series of LUT's, however that would tend to slow down the response time of the system. More-specifically, sky-map LUT 464a could be subdivided into a sensor-independent that determines sky-contribution as seen through a white-band sensor (no filtering). A multiplier and second LUT (which also receives the N signal) could then factor in the change in sky-contribution due to filtering by the in-use sensor.

By way of another example, rather than considering the full band response of each sensor and integrating accordingly over the relevant wavelength range, $\lambda_0$ to $\lambda_1$ of that specified sensor, the response could be broken up into sub-bands for both the sensor and sources of illumination. The end results would then be summed together. This approach may have some appeal where sensor response is to be tuned on a sub-band by sub-band basis. However the size of the system becomes large due to the parallel processing of all the sub-band information.

By way of further example, each uniquely-addressable, texel record 420 of the texels-defining memory or corresponding Per-Texel Output Signal (PTOS) does not have to be as complicated as the data structure shown at 420 of FIG. 4A. It is sufficient to have a single material identification (MID) per-texel and a single slope-defining value per-texel. That is enough to perform a crude upwards look towards the sky to determine what radiance will be contributed by the sky to the texel and what will be reflected and/or radiated by the surface material of the texel to the sensor. As already explained above, it is within the contemplation of the invention to use data other than direct, normal data, N for defining the surface slope of each texel. Normal data, N, in terms of two spherical angles, $\theta$, $\phi$, is preferred because this a quickest and most compact way of precisely defining an upwards look toward the sky on a per-texel basis. However, the normal could be given in terms of three or more normalized vector quantities such as: $n_x$, $n_y$, and $n_z$. Alternatively, the per-texel normal could be calculated from per-texel, surface tangent data that is given in a form such as, dx/dZ and dy/dZ or an equivalent where Z is elevation. Alternatively, the per-texel normal could be calculated in terms of dZ/dx and dZ/dy from a providing of two or more, per-texel elevation values, such as $Z_1$ and $Z_2$ at relative texel points such as corner points $x_1, y_1$ and $x_2, y_2$ within each texel. Alternatively, the per-texel normal could be calculated in terms of dZ/dx and dZ/dy from a provision of one elevation value per-texel and from use of one or more elevation values provided on a per-texel basis for neighboring texels. Thus, there are a variety of different, direct or indirect ways that will enable the effect of performing an upwards look toward the sky on a per-texel basis and determining what sky contribution is made on a per-texel basis. Alternatively, single slope-identifying values may be given on a per-texel basis and used to look up corresponding, normal values on a per-texel basis. The illustrated way in FIG. 4A of providing normal data, N, in-terms of two spherical angles, $\theta$, $\phi$, on a per-texel basis is the preferred, but not only way.

Given the above disclosure of general concepts and specific embodiments, the scope of protection sought is to be defined by the claims appended hereto.

What is claimed is:

1. A method for providing real-time sensor simulation of a terrain, the terrain stored in a database of texture elements (texels), each texel associated with a material having an material identification (MID) and an associated normal, a plurality of the texels illuminated by at least one energy source in a sky, the method comprising:

for each MID, predetermining a sensor-modulated reflectance value for the identified material and the simulated sensor;

predetermining a first amount of radiant power originating from each of a plurality of energy sources located in a plurality of regions in the sky at a first time;

receiving a texel;

determining a region in the sky associated with the normal of the received texel;

obtaining the amount of radiant power originating from the determined region;

obtaining the predetermined sensor-modulated reflectance value of the MID associated with the received texel; and providing a first output as a function of the obtained radiant power and the obtained sensor-modulated reflectance value.

2. The method of claim 1, further comprising:

for each MID, predetermining a sensor-modulated black body emissance at a plurality of temperatures for the identified material and the sensor;

determining a temperature of the MID associated with the received texel;

obtaining the sensor-modulated black body emissance at the determined, temperature for the identified material; and providing as a second output the obtained sensor-modulated black body emissance.

3. The method of claim 2 wherein predetermining the sensor-modulated black body emissance at the plurality of temperatures for the identified material and the sensor further comprises:

determining a spectral sensor sensitivity for each of a plurality of wavelengths;

determining for each of the plurality of wavelengths and for each of a plurality of temperatures the black body radiation for the wavelength at the temperature; and for each temperature, integrating the product of the determined black body radiation and the spectral sensor sensitivity over the plurality of wavelengths.

4. An The method of claim 3 further comprising storing the result of the integration in a lookup table (LUT) indexed by temperature.

5. The method of claim 2 wherein determining a temperature of the MID associated with the received texel further comprises:

predetermining an amount by which a temperature of the material associated with the MID increases as a result of solar loading;

determining an amount of solar loading received by the texel; and obtaining the temperature increase resulting from solar loading of the texel.

6. The method of claims 5 wherein determining an amount of solar loading received by the texel further comprises:

predetermining a second amount of radiant power originating from each of the plurality of energy sources located in the plurality of regions in the sky at a second time by:

determining a spectral sensor sensitivity for each of a plurality of wavelengths;

determining for the energy source a second spectral power distribution for each of the plurality of wavelengths at the second time;

determining for the energy source an angular coverage distribution in the sky at the second time;

for each region, integrating the product of the energy source's power distribution at the second time and its angular coverage distribution at the second time over the plurality of wavelengths to determine a second amount of radiant power for each region;

decaying the predetermined first amount of radiant power by an amount in proportion to the interval between the first and second times; and determining as the amount of solar loading the sum of the second current radiant power and the decayed first amount of radiant power.

7. The method of claims 1, wherein predetermining a sensor-modulated reflectance value for the identified material and the sensor further comprises:

determining a spectral sensor sensitivity for each of a plurality of wavelengths;

determining a spectral reflectance for the identified material for each of the plurality of wavelengths; and integrating the product of the spectral sensor sensitivity and the spectral reflectance over the plurality of wavelengths.

8. The method of claim 7 further comprising storing the sensor-modulated reflectance value for the identified material and the sensor in a lookup table (LUT) indexed by material identification (MID).

9. The method of claims 7 wherein the plurality of wavelengths comprise a range of wavelengths to which the sensor is responsive.

10. The method of claim 1 wherein predetermining the amount of radiant power originating from each of the plurality of energy sources located in the plurality of regions in the sky further comprises:

determining a spectral sensor sensitivity for each of a plurality of wavelengths;

determining for the energy source a spectral power distribution for each of the plurality of wavelengths;

determining for the energy source an angular coverage distribution in the sky; and for each region, integrating the product of the energy source's power distribution and its angular coverage distribution over the plurality of wavelengths.

11. The method of claim 10 further comprising:

storing the result of the integration in a lookup table (LUT) indexed by sky region.

12. The method of claim 11 wherein the index includes a heading and elevation.

13. The method of claim 1 wherein each texel includes associated shadowing information, the method further comprising:

responsive to the associated shadowing information of the received texel indicating that the texel is in a shadow: providing as output an ambient value.

14. A computer program product stored on a computer readable medium for providing real-time sensor simulation of a terrain, the terrain stored in a database of texture elements (texels), each texel associated with a material having an material identification (MID) and an associated normal, a plurality of the texels illuminated by at least one energy source in a sky, the computer program product controlling a processor coupled to the medium to perform the operations of:

for each MID, predetermining a sensor-modulated reflectance value for the identified material and the simulated sensor;

predetermining a first amount of radiant power originating from each of a plurality of energy sources located in a plurality of regions in the sky at a first time;

receiving a texel;

determining a region in the sky associated with the normal of the received texel;

obtaining the amount of radiant power originating from the determined region;

obtaining the predetermined sensor-modulated reflectance value of the MID associated with the received texel; and providing a first output as a function of the obtained radiant power and the obtained sensor-modulated reflectance value.

15. A system for performing real-time sensor simulation of a terrain, the system comprising:

a first lookup table (LUT) for providing sensor-modulated reflectance values for each of a plurality of stored material identifications (MIDs);

a second LUT for providing a radiant power value for each of a plurality of energy sources located in a plurality of regions in a sky;

a luminance generator, communicatively coupled to the first LUT and second LUT, configured to receive a texel having an associated normal, and to obtain from the first LUT a sensor-modulated reflectance value of the MID associated with the texel, and to obtain from the second LUT a radiant power value for the energy sources located in a region associated with the normal; and an output module communicatively coupled to the luminance generator for providing as an output a function of the value obtained from the first LUT and the value obtained from the second LUT.

16. A system for providing real-time sensor simulation of a terrain, the terrain stored in a database of texture elements (texels), each texel associated with a material having an material identification (MID) and an associated normal, a plurality of the texels illuminated by at least one energy source in a sky, the system comprising:

first predetermining means, for predetermining for each MID a sensor-modulated reflectance value for the identified material and the simulated sensor;

second predetermining means, for predetermining a first amount of radiant power originating from each of a plurality of energy sources located in a plurality of regions in the sky at a first time;

receiving means, for receiving a texel;

determining means, communicatively coupled to the receiving means, a region in the sky associated with the normal of the received texel;

first obtaining means, communicatively coupled to the determining means and the second predetermining means, for obtaining the amount of radiant power originating from the determined region;

second obtaining means, communicatively coupled to the receiving means and the first predetermining means, for obtaining the predetermined sensor-modulated reflectance value of the MID associated with the received texel; and providing means, communicatively coupled to the first obtaining means and the second obtaining means, for providing a first output as a function of the obtained radiant power and the obtained sensor-modulated reflectance value.

* * * * *

UNITED STATES PATENT AND TRADEMARK OFFICE
CERTIFICATE OF CORRECTION

PATENT NO. : 6,735,557 B1
DATED : May 11, 2004
INVENTOR(S) : Javier Castellar et al.

It is certified that error appears in the above-identified patent and that said Letters Patent is hereby corrected as shown below:

Column 35,
Line 15, delete "An"
Line 54, replace "claims" with -- claim --

Column 36,
Line 1, replace "claims" with -- claim --

Signed and Sealed this

Fourteenth Day of September, 2004

JON W. DUDAS
*Director of the United States Patent and Trademark Office*